Feb. 20, 1962   J. B. ROCKSTEAD   3,022,425
DUAL FUEL CONTROL SYSTEMS FOR ENGINES
BURNING DIESEL-TYPE FUELS
Filed July 11, 1956   8 Sheets-Sheet 1
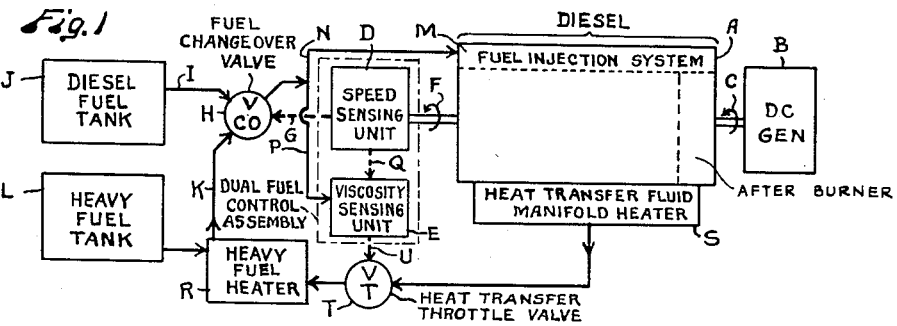
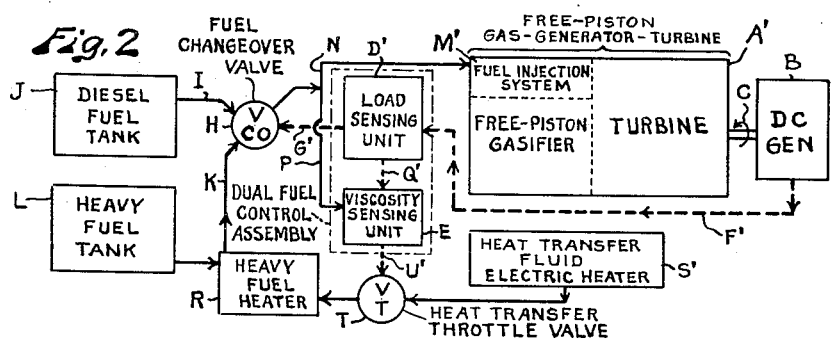
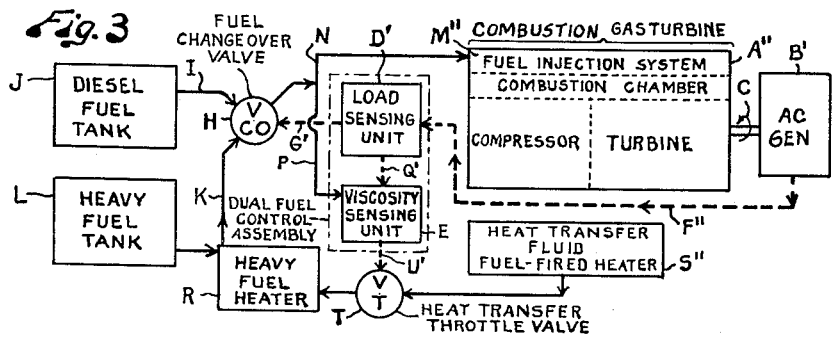
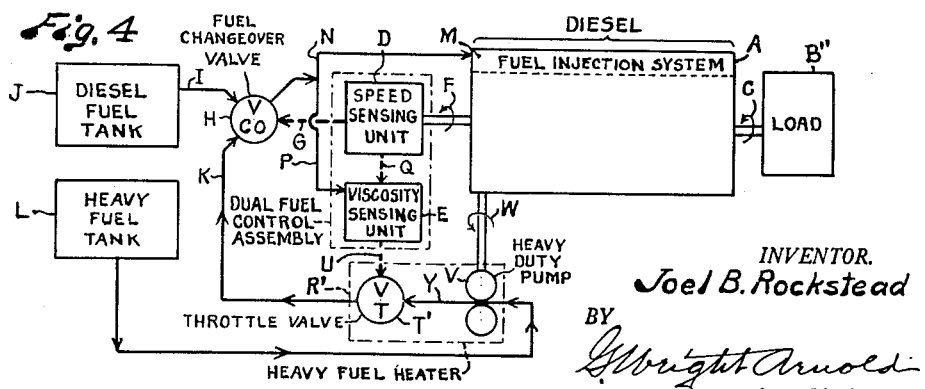
INVENTOR.
Joel B. Rockstead
BY
ATTORNEY Feb. 20, 1962 J. B. ROCKSTEAD 3,022,425
DUAL FUEL CONTROL SYSTEMS FOR ENGINES
BURNING DIESEL-TYPE FUELS
Filed July 11, 1956 8 Sheets-Sheet 3

INVENTOR
Joel B. Rockstead

BY

ATTORNEY

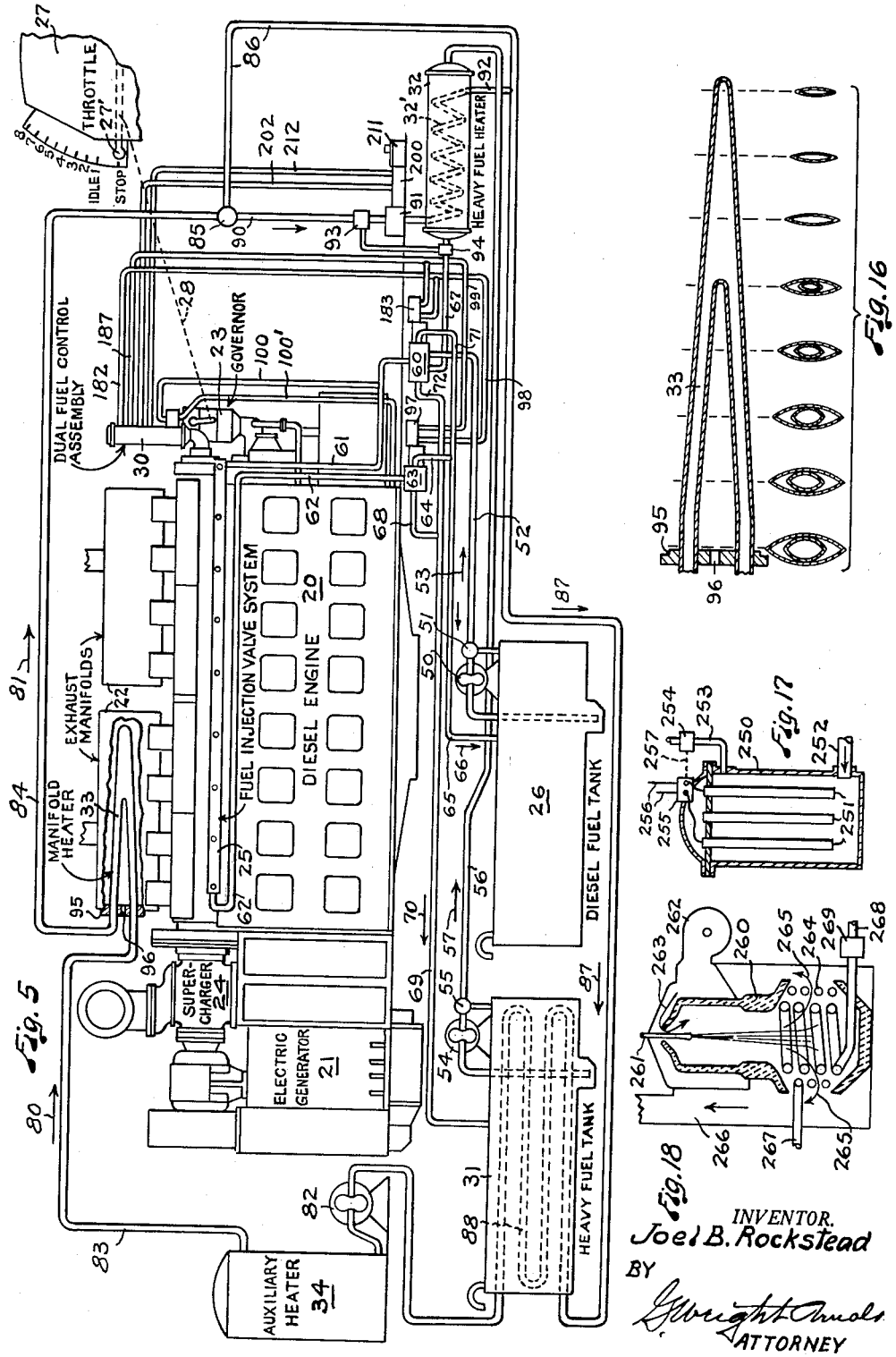

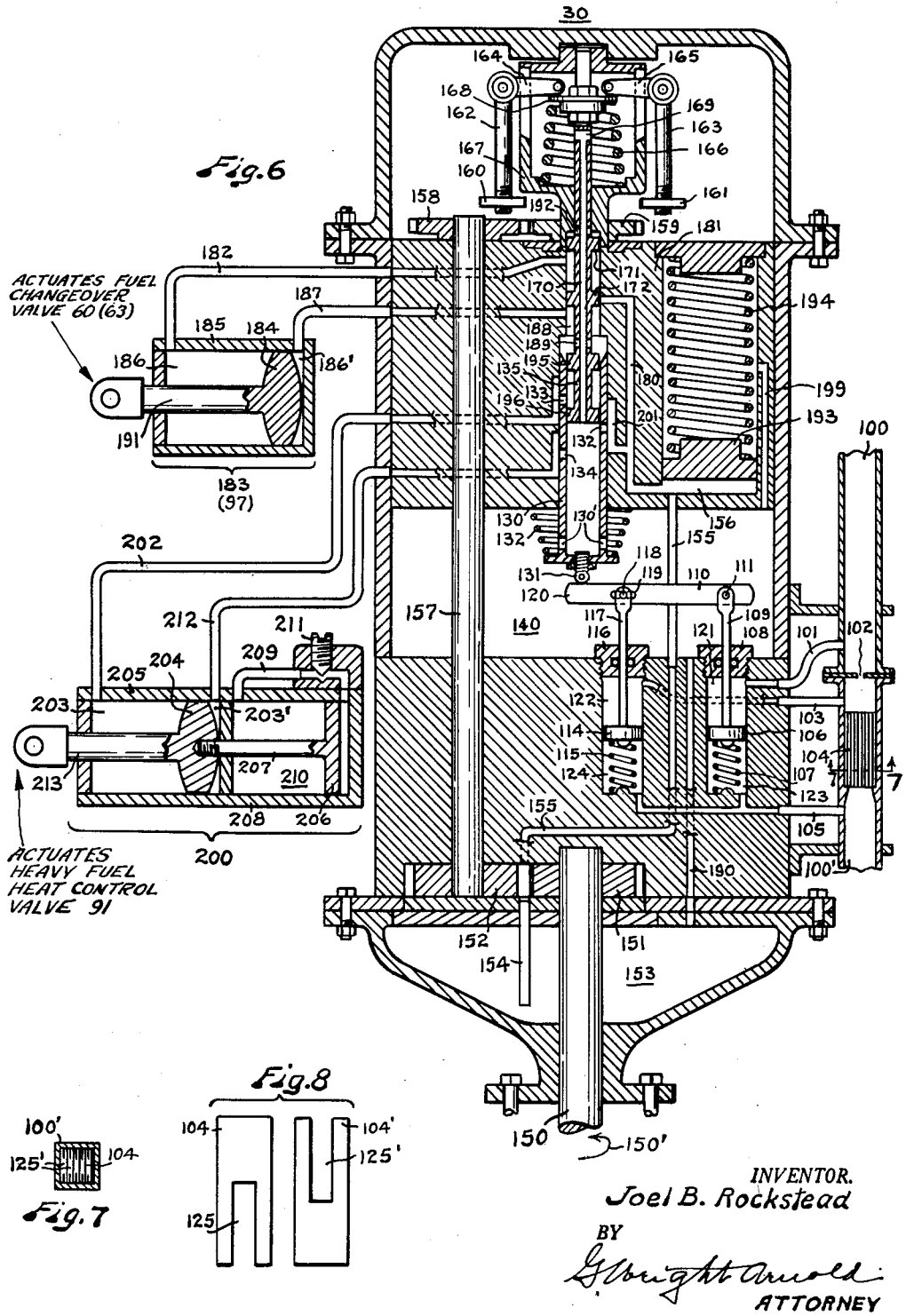

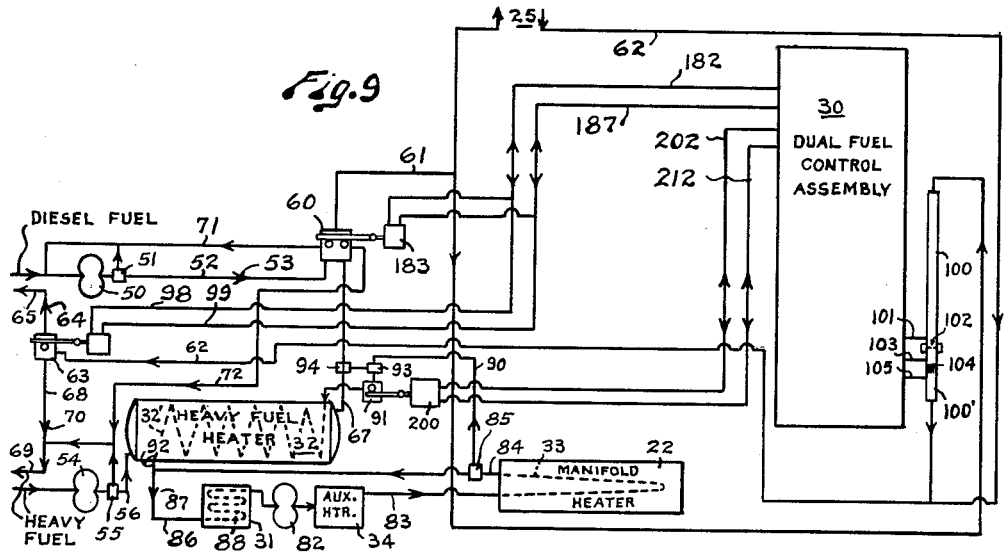
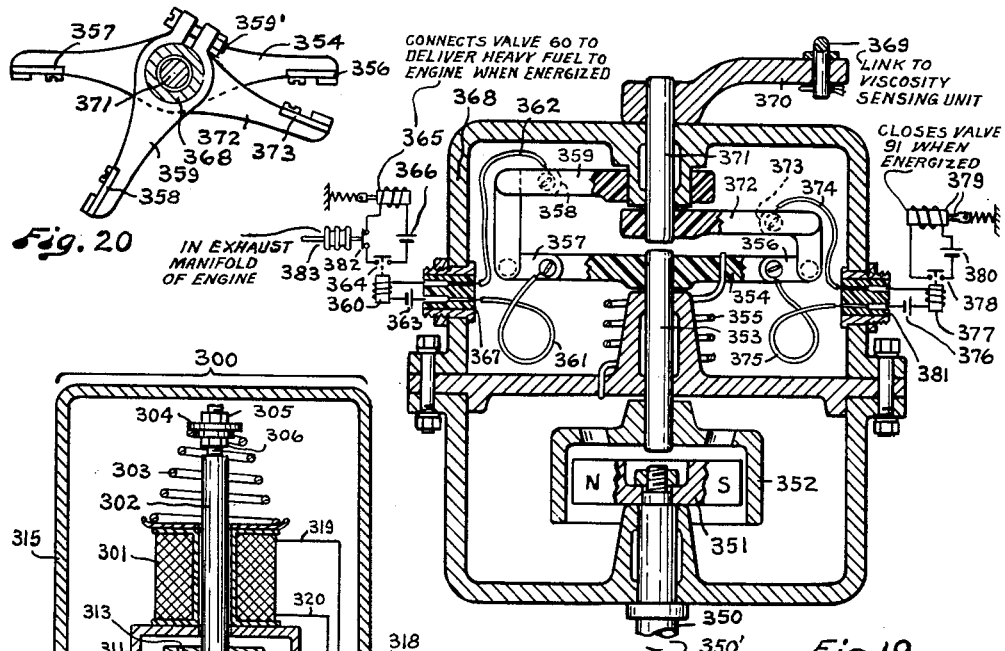
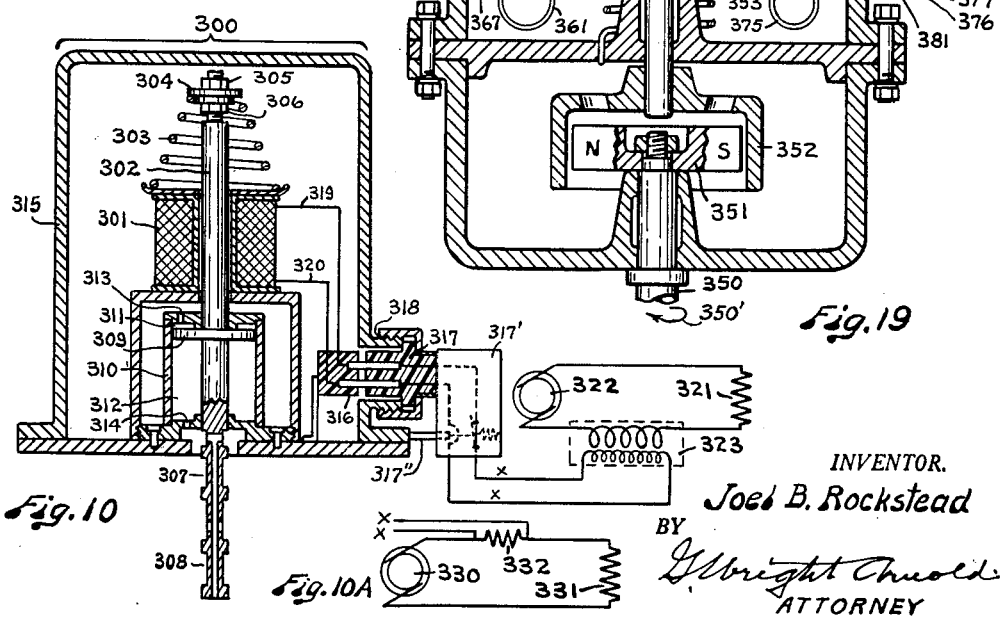

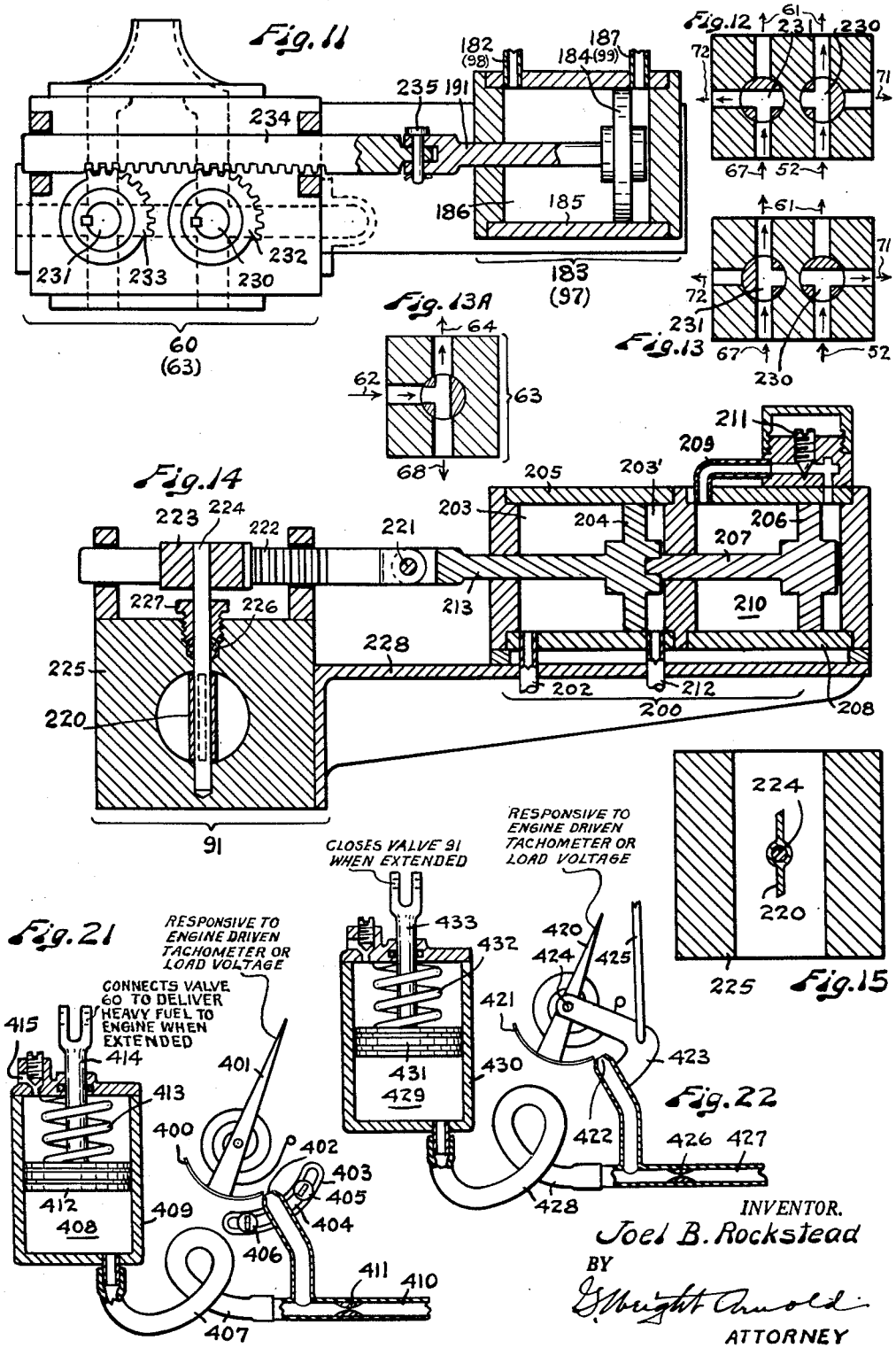

Feb. 20, 1962　　　　J. B. ROCKSTEAD　　　　3,022,425
DUAL FUEL CONTROL SYSTEMS FOR ENGINES
BURNING DIESEL-TYPE FUELS
Filed July 11, 1956　　　　　　　　　　　　8 Sheets-Sheet 8
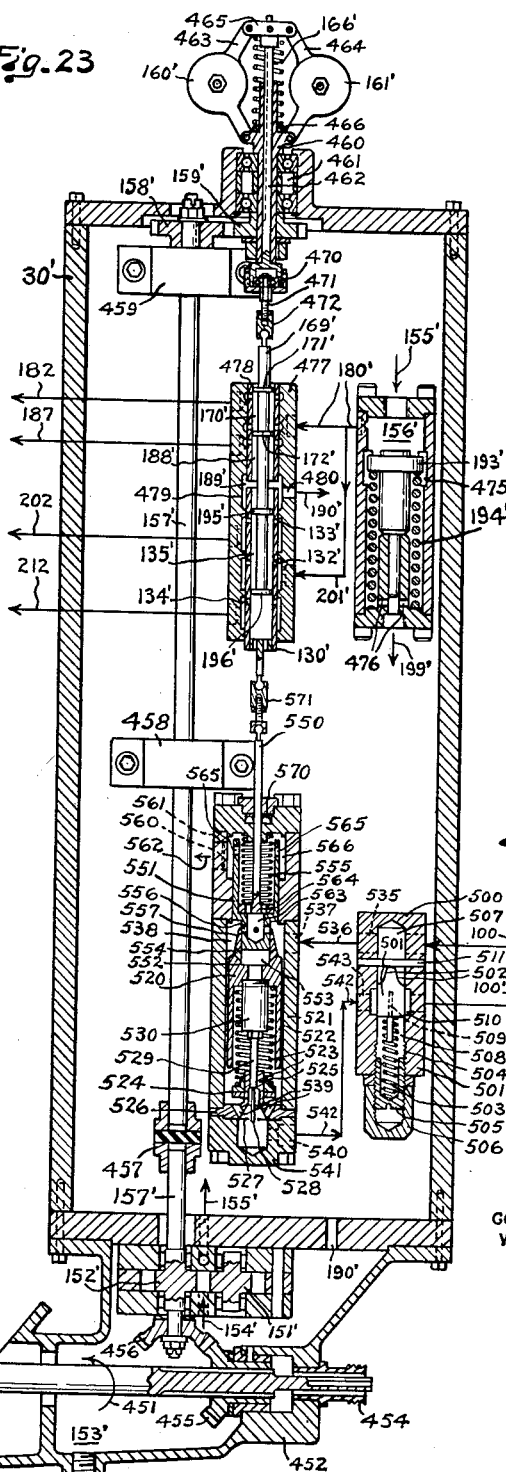
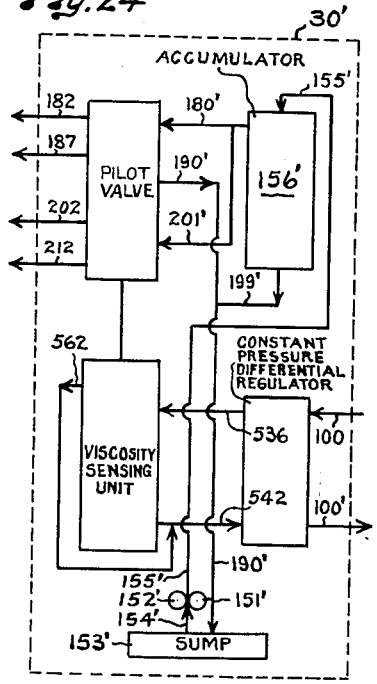
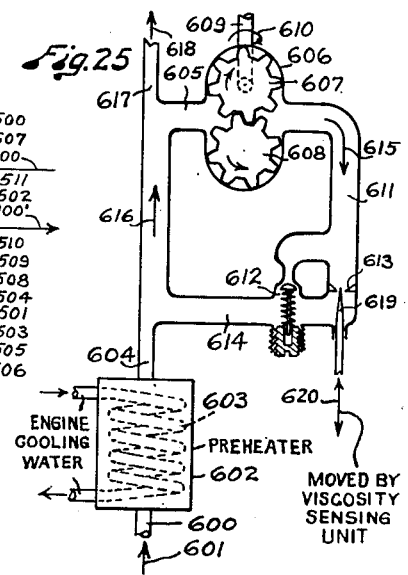
INVENTOR.
Joel B. Rockstead
BY
ATTORNEY

United States Patent Office 3,022,425
Patented Feb. 20, 1962

3,022,425
DUAL FUEL CONTROL SYSTEMS FOR ENGINES BURNING DIESEL-TYPE FUELS
Joel B. Rockstead, Seattle, Wash., assignor, by mesne assignments, to Midland-Ross Corporation, Cleveland, Ohio, a corporation of Ohio
Filed July 11, 1956, Ser. No. 597,182
19 Claims. (Cl. 290—40)

The present invention relates to fuel control systems for prime movers, and more particularly relates to dual fuel control systems for power plants having engines burning diesel-type fuels, such as diesel-electric plants, free-piston gas-generator-turbines, combustion gas turbines and the like, such dual fuel control systems enabling the prime mover to be operated on diesel grade fuel when a factor of engine performance such as speed or generated load is relatively low and enabling the engine to be operated automatically and efficiently on what is known in the art as heavy fuel when such factor of engine performance is relatively high.

In order to provide a more complete understanding of the present invention, and particularly the advantages thereof evolved from the power responsive fuel viscosity regulation afforded thereby as affecting efficiency and economy of operation of these types of prime movers, it is considered important to first set forth certain of the fundamental considerations affecting maximum utilization of these fuels in such prime movers.

According to conventional practice, engines of the class described consume through the entire operating range thereof a rather completely refined diesel fuel, and as such may be referred to as engines burning diesel-type fuels. Fuels of this type are costly since continually increasing demand and requirements for close control in refining methods have pyramided costs. These and other factors have materially lessened the economic advantages of such prime movers, operationally considered.

Engineering studies of the operating cycles of these engines have shown that in the higher power output ranges thereof a much cheaper inferior grade fuel of the type known in the refining and operational fields as so-called heavy or "residual" fuel can be utilized, provided technical difficulties relating to handling of the fuel and combustion thereof can be overcome. Due primarily to a lack of knowledge of the true factors involved, considerable effort has been expended in the past to overcome the technical obstacles in use of heavy fuels without notable or reliable success. Lindemann British Patent 10,340/1911 presents a fuel system involving proportioning and blending of light oil and unheated heavy oil under control of the engine speed governor, the proportion of heavy oil being increased with increase in speed. Daimler-Benz German Patent 627,261 (1931) presents a dual fuel system for changeover from light oil to heavy oil in response to engine speed, the changeover valve being linked mechanically directly to a speed responsive fly ball governor and similarly does not contemplate regulated heating of the heavy oil. Meyer U.S. Patent 1,819,474 (1931) is typical of prior systems wherein an attempt has been made to utilize heavy fuel in a dual fuel system for diesel engines by heating the heavy fuel with the engine cooling water. Loft U.S. Patent 2,681,694 (1954) presents a manual changeover dual fuel system for use with a combustion gas turbine, involving alternative use of diesel oil and Bunker C fuel oil, the latter being heated to a constant temperature of about 220° F.

All other known experiments in utilization of heavy fuels in these types of engines have been directed primarily to manual operation, with a fuel of somewhat inferior grade or a blended combination of fuels, with manually controlled heavy fuel heating and manual fuel changeover, if any. Such manual selection and control or predetermination of the type and temperature of fuel requires that the operator determine the degree to which the inferior grade of heavy fuel should be heated and when such fuel can be delivered to the engine. This requirement of human control and the necessarily rather arbitrary and the inherent factor of human error is clearly undesirable and has resulted in widely varying results. Further, no known prior dual fuel control system provides automatic, servo-controlled fuel changeover, nor automatically regulates the degree of heating of the heavy fuel, nor correlates the degree of heating thereof with a factor of engine performance reflecting power output thereof, such as engine speed or generated load.

In engines of the character described, particularly with regard to use of heavy fuels therein, efficiency of combustion of a given fuel is of prime importance. Accordingly, a clear understanding of the combustion process and the general factors affecting efficiency of combustion in prime movers of the character presented is necessary.

The combustion process in a diesel engine, for example, is accomplished within a closed cylinder provided with a reciprocating piston. Air is introduced into this cylinder through intake ports or valves by the action of the piston moving downwardly with the intake ports or valves open. The pressure in the cylinder at this stage of the cycle is subatmospheric and air flows into the cylinder. A pump, known as a scavenger or supercharger, is sometimes used to increase the quantity and the speed of the air entering the cylinder.

With the intake ports or valves and the exhaust ports or valves closed, the air is compressed in the closed cylinder by the piston being forced upwardly, the air thereby increasing in turbulence and temperature, which action is enhanced by use of known types of piston head and cylinder head designs. As the piston approaches the cylinder head, the air in the cylinder becomes highly heated due to compression. At a predetermined time before the piston reaches the upward limit of its travel a charge of fuel is sprayed into the highly heated air from a cyclically controlled fuel injection system having a fuel injection nozzle situated in each cylinder, and combustion of the fuel occurs. The combustion of the fuel causes a rapid increase in pressure, forcing the piston downwardly, producing work. As the piston reaches the end of its downward travel in the cylinder, the exhaust ports or valves are opened and the burnt gases are expelled to the atmosphere.

Diesel engine fuel injection systems functioning in this manner are, of course, well known and no modification thereof is necessary in applications of dual fuel systems according to the present invention to such prime movers.

The combustion process of a free-piston gasifier in a free-piston gas-generator-turbine involves a similar fuel metering and fuel injection system as employed in diesel engines in that both types of engines involve cyclic injection and compression ignition of the fuel. Accordingly, it will be apparent that the dual fuel control system of the present invention is equally applicable thereto, since no modification or design change in the fuel injection system of the free-piston gasifier is necessary.

In a combustion gas turbine engine, the combustion process occurs continuously within the confines of a fixed volume combustion chamber rather than a variable volume combustion chamber, with combustion conditions being otherwise comparable to diesel engine operation. In a combustion gas turbine, a compressor forces air at a high rate of speed into the fixed combustion chamber in sufficient quantity to produce the desired power when the proper amount of fuel is sprayed into the air charge. Combustion is accomplished from an external source when starting this type of engine and, after starting, is a continuous process of fuel and air entering the combustion chamber, igniting, and burning along a flame front, the hot gases expanding through the turbine blades, producing work.

As is the case with diesel engines and free-piston gasifiers in free-piston gas-generator-turbines, combustion gas turbines also burn diesel-type fuel and have a characteristic fuel injection system to which a selected diesel or heavy fuel is delivered under pressure by the dual fuel control system of the present invention, the fuel injection system in each instance being conventional in the given type of prime mover.

A specific and typical diesel engine in widespread commercial use in the locomotive field is General Motors Model 567B, a number of operative and constructional details of which are set forth in Model 567B Engine Manual No. 252B, 4th edition, March 1953, distributed by the Electro-Motive Division, General Motors Corporation, La Grange, Illinois. This type of prime mover is used in Model F7 locomotives and Enginemen's Operating Manual for Model F7 Locomotives, 1st edition, February 1949, distributed by the same concern, is also of interest for conventional operative and constructional details pertaining to this type of power plant application and for a consideration of associated auxiliary equipment.

Free-piston gas-generator-turbine plants have been known for some years and are currently under extensive development for locomotive use. Broadly, in such type of plant, a free-piston gasifier generates combustion gases at elevated temperatures, which gases drive one or more turbines mechanically driving an electric generator in turn driving the locomotive traction motors. Recent technical papers setting forth various operative and constructional details with respect to this type of power plant include ASME papers 55-A-146 and 55-A-155, both by W. A. Morain and S. L. Soo, entitled "Some Design Aspects of the Free-Piston Gas-Generator-Turbine Plant," parts 1 and 2 (presented at the ASME meeting, Chicago, Illinois, November 13-18, 1955).

Also of interest for additional detail of a locomotive power plant incorporating a free-piston gas-generator-turbine is Paper A-13 (1955) of the Congrès International des Moteurs à Combustion Interne, Paris, France, setting forth a treatise by F. Picard and M. Chatel, entitled "La Locomotive Turbo-Diesel 'Renault' Réalisations Actuelles et Futures."

Recent literature concerning a locomotive power plant incorporating a combustion gas turbine, in addition to the aforementioned Loft U.S. Patent 2,681,694, includes an article entitled "First Gas-Turbine Is Installed in Locomotive" appearing at pages 62-64 and 78 in the July 1949 issue of Diesel Power and Diesel Transportation, and an article entitled "Gas-Turbine Electric Locomotives—A Progress Report" appearing at pages 54-59 in the June 1953 issue of the same publication.

It will be noted that the combustion processes in all of the prime movers briefly discussed are very similar in that they require a controlled amount of highly heated air and require the fuel to be sprayed into the heated air in a finely divided state.

Also, high turbulence in the air charge is necessary to promote contact of the fuel with the oxygen of the air charge. If the turbulence is too great, much of the heat in the air charge will be lost through the combustion chamber walls, and the combustion process will be retarded, with corresponding reduction in fuel efficiency.

As the speed of a variable speed prime mover burning diesel-type fuel is reduced by reducing the amount of fuel, several things occur which further complicate the combustion process. The air turbulence rate is reduced, the combustion chamber wall temperature is generally reduced, and the fuel velocity through the fuel spray orifice may be reduced, changing the fuel spray pattern.

Correspondingly, when a reduction in load on a constant-speed engine is compensated for by reduction in the amount of fuel delivered to the engine, the combustion process is complicated by a reduction in combustion chamber temperature and possible reduction in fuel spray velocity. The air turbulence rate remains the same, since the engine speed remains constant, but the air temperature is reduced due to lesser heat generation, the heat being removed through the combustion chamber walls remaining approximately constant.

From these considerations it is evident that as a factor reflecting engine performance is reduced, such as engine speed and/or generated load, the fuel quality requirement from a combustion standpoint becomes greater.

Engine performance in terms of power output is essentially determined by the engine speed and torque according to the formula $$\frac{TN}{63,000} = P$$

where T is torque in pound inches, N is speed in revolutions per minute and P is power in horsepower.

The N factor, engine speed, can be sensed directly, and the T factor, torque, is directly proportional to the generated load current at constant speed and is to a large degree also proportional to generated load current at variable speeds, within a tolerance of less than 20% in normal operation, depending upon the degree of compounding of the generator field, assuming the power plant load as being an A.C. or D.C. generator.

Thus, from a practical point of view, either engine speed or generated load current in a variable speed power plant, or generated load current in a constant speed power plant, serves as satisfactory indications that the power output is such that the engine will accept heavy fuel heated an appropriate degree, i.e. that air turbulence and temperature conditions in the combustion chamber of the engine are then such that heated heavy fuel will ignite and burn. This is particularly true when the power plant comprises an electric generator in turn remotely driving the traction equipment or other mechanical load, since in such event the mechanical load cannot markedly vary either engine speed or generated load, i.e. cannot directly "drive" or overload the prime mover. Even where the power plant is directly coupled to a mechanical load, such as a diesel truck installation, engine speed serves satisfactorily as a factor of engine performance reflecting power output and consequently the fuel viscosity requirement of the engine for all normal modes of operation.

In prior practice, efficient operation of prime movers of the character indicated has been dependent upon the use of high-to-good grades of diesel fuel, dictated by the complexity of the combustion system of a particular engine. Some prime movers in the lower speed and/or load operating range are so critical in fuel performance demands as to require the highest quality in diesel fuels. As has been indicated, fuels of this type are expensive because of the careful selection of crude oil stock and the refining procedures necessary to produce them. All present diesel engines, for example, by predetermined design have adopted standards of air turbulence, combustion chamber temperature, air charge temperature, and velocity fuel spray formation which require at least a fairly good grade of diesel fuel for complete combustion at low and very low power output values. This requirement also applies to free-piston gasifiers and combustion gas turbine engines because products of incomplete combustion deposit on moving parts and cause mechanical failure in a very short period unless at least a good grade of diesel fuel is used.

Having presented certain of the factors producing complexities in the combustion of fuel in these types of engines, appropriate determination shall now be undertaken with respect to the pertinent physical and chemical characteristics of certain liquid hydrocarbon fuels which can be utilized in engines of the character described by means of a dual fuel control system according to the present invention.

The oxygen, fuel, time, and temperature requirements necessary for an efficient combustion process for any given set of operating conditions have been previously generally stated. From these general considerations it will be apparent that any fuel regardless of quality must meet these requirements if efficient combustion is to be accomplished.

Consequently, the first criterion for a liquid hydrocarbon fuel is its ability to break up or spray upon injection so that sufficient oxygen can unite with the hydrocarbon molecules in the fuel to satisfy combustion requirements. To accomplish this in fuel injection systems of standard design in any of the above types of prime movers, the most important determining factor is the viscosity of the fuel.

The second criterion of such a fuel is the boiling or volatilization point of a liquid fuel, i.e. the temperature at which the fuel will change in form from a liquid to a gas. When in the latter state the oxygen of the air can easily unite with the fuel molecule. This criterion is subject to some qualification, however, since some fuels cannot be gasified under attainable operating conditions and combustion thereof must be primarily of the surface type.

The third criterion of such a fuel is the ignition temperature of the fuel. Sometimes called the spontaneous ignition temperature, this characteristic is often measured in the diesel engine field as cetane number. Thus, cetane number in effect provides an indication of the temperature at which the fuel molecule when satisfied with sufficient oxygen will ignite and burn.

Since all commercial fuels have very complex molecular structures, the three criteria enumerated above are necessarily inter-related.

Approximate values of these major characteristics for several pertinent types of fuel, listed in decreasing order of quality, are set forth in Table I, as follows:

*Table I*

| Fuel No. | Description | Cetane number minimum | Viscosity SUS at 100° | Refining end boiling point °F. |
|---|---|---|---|---|
| 1 | High grade diesel fuel | 50 | 35-40 | 550 |
| 2 | Good grade diesel fuel | 45 | 35-40 | 650 |
| 3 | Fair grade diesel fuel | 40 | 35-40 | 750 |
| 4 | Economy grade diesel fuel | 35 | 35-40 | 750 |
| 5 | Cutter stock cracked | ¹25 | 35-40 | 750 |
| 6 | Light bunker | | 300-700 | |
| 7 | Heavy bunker | | 1,000-5,000 | |

¹ Maximum.

It is within the cognizance of those skilled in the art that all diesel-type fuel burning engines will operate throughout their entire range on fuel No. 1, that the less critical high speed engines will operate on fuel No. 2, and that low speed engines will operate on fuel No. 3. Some of the low speed heavy duty engines might operate under emergency conditions for short periods on fuel No. 4 without insurmountable difficulty, but most certainly not the other more critical groups of engines. But the so-called heavy fuels, of which Nos. 4, 5, 6, and 7 above are examples, cannot be used throughout the complete operating range of all such engines by conventional practice.

Accordingly, although subject to a limited degree of variation by practice in the refining and operating arts, heavy fuels can be defined generally for purposes of understanding the present invention as fuels of heavier viscosity and/or of the residual type which are not commonly known as diesel fuel, i.e., having a viscosity at or exceeding 45 Saybolt Universal seconds at 100° F., having a cetane number of 40 or lower, and having an end boiling point of at least 700° F.

Objectively considered, the present invention provides a dual fuel control system by means of which such heavy fuels can be utilized in the higher power output ranges of prime movers of the character indicated, with provision made to automatically and accurately change back to diesel fuel in the lower power output ranges in response to a factor of engine performance reflecting power output, such as engine speed or generated load.

Objectively considered, the dual fuel control system herein presented further provides for automatic, servo-controlled changeover of the fuel supplied to an engine burning diesel-type fuel from diesel fuel to the heavy fuel of inferior grade at higher power output levels, and for automatic, servo-controlled, power output responsive heating of the heavy fuel to temperatures producing an appropriate viscosity to insure a satisfactory fuel spray for efficient combustion as and when the heavy fuel is delivered to the fuel injection system of the engine.

A further object of the present invention is to provide a dual fuel control system for diesel-type fuel burning engines, capable of ready adjustment to efficiently and automatically select the most economical fuel throughout the entire power output range without requiring reliance on manual control by an operator, the factor of human error thereby being eliminated.

Another object of the present invention is to provide a dual fuel control system for diesel-type fuel burning engines, by means of which conventional diesel fuel is utilized during periods of relatively low power output, and more economical heavy fuel is utilized for relatively high power output, with changeover from one such fuel to the other being automatically provided through a fuel control system including control components sensing a factor of engine performance such as engine speed or generated load.

It is a further object of the present invention to provide an automatic dual fuel control system of the character described, wherein such dual fuel control system, in addition to the engine performance sensing control components, further incorporates component means for sensing the viscosity of the fuel being delivered to the fuel injection system of the engine, and means for regulating the viscosity of the heavy fuel to the optimum required by varying conditions of operation of the engine in terms of power output.

It is yet another object of the present invention to provide, in an automatic dual fuel control system for engines burning diesel-type fuel an automatic fuel changeover system under control of an engine performance sensing element, i.e., speed and/or load sensing element, and a fuel viscosity sensing element to produce a mode of operation in such prime mover whereby the prime mover is started and operates at low power output with conventional diesel fuel and, when engine performance becomes such that heavy fuel can be used with a degree of pretreatment in heavy fuel heating means, such heavy fuel will be automatically delivered to the engine under control of said engine performance responsive element, and will be preheated to the appropriate degree under control of a fuel viscosity sensing element and said engine performance responsive element, thereby providing a significant increase in fuel economy in such engines in terms of both combustion efficiency and fuel cost.

It is a further object of the present invention to provide an automatic dual fuel control system for diesel-type fuel burning engines, by means of which heavy fuel is satisfactorily utilized during higher power output engine performance, such fuel control system, by means of a fuel viscosity sensing element, automatically compensating for variations in viscosity of the heavy fuel employed and automatically adapting the system to successive heavy fuels of different viscosity and density characteristics.

It is an additional object of the present invention to provide, in a heavy fuel system for diesel-type fuel burning engines, an arrangement for heating the heavy fuel by controlled circulation of a secondary heat transfer fluid. It is a related and more specific object of the present invention to provide in a dual fuel control system of the character indicated, a regulated heavy fuel heating means incorporating either controlled circulation of a secondary heat transfer fluid, wherein such secondary heat transfer fluid derives a heat input from heat exchange with manifold gases in a manifold gas heater, from an electric heater, from a fuel fired heater, or incorporating direct heating of the heavy fuel, as by heat generated by pressure in a heavy duty pump in turn driven by the prime mover. It is a further related object of the present invention to provide, in conjunction with secondary heat transfer means for heating heavy fuel in a fuel system of the character described, an automatically operable cutoff valve in the input line to the heavy fuel heater to prevent thermal overload therein and effectively eliminate any tendency toward depolymerization or cracking of the heavy fuel.

It is a further object of the present invention to provide automatic dual fuel control systems for diesel-type fuel burning engines wherein the engine performance sensing elements may, according to predetermined design, effect control of the dual fuel changeover mechanism by hydraulic, electric, or pneumatic actuation.

It is a further object of the present invention to provide, in an automatic dual fuel control system for diesel-type fuel burning engines, means for effecting actuation of the heavy fuel heat control mechanism by hydraulic, electric, or pneumatic energization under control of engine performance and fuel viscosity sensing elements.

Additional and more specific objects of the present invention involve presentation of typical embodiments thereof directed specifically to hydraulically actuated dual fuel control systems for use in conjunction with a variable speed, variable load engine involving speed responsive and viscosity sensing components; to a modified embodiment thereof having a hydraulically actuated dual fuel control system for use in conjunction with a constant speed, variable load engine wherein one control element is generated load current responsive, and to other various typical modifications of the dual fuel control system according to the present invention wherein the engine performance and fuel viscosity sensing elements selectively actuate electric and/or pneumatic control circuits to provide electrical or pneumatic actuation of the dual fuel control means and heavy fuel heat control means, as desired.

These and other objects of the present invention will be apparent from the following description of typical specific examples thereof, wherein like numerals designates like parts unless otherwise indicated, and wherein:

FIGURE 1 is a functional block diagram, with circulating pumps, by-pass valves and return lines omitted for clarity, illustrating application of the present invention to a variable speed, variable load diesel-electric power plant wherein such dual fuel control system senses engine speed as a factor of engine performance reflecting power output, and utilizes a manifold heater as a heat input means for the secondary heat transfer fluid.

FIG. 2 is a functional block diagram, similar to FIGURE 1 but illustrating application of the present invention to a variable speed, variable load free-piston gas-generator-turbine power plant generating electric power, wherein the dual fuel control system senses generated load current as a factor of engine performance and incorporates an electric heater as the heat input source for the secondary heat transfer fluid.

FIG. 3 is a functional block diagram, similar to FIGS. 1 and 2 but illustrating application of the present invention to a constant speed, variable load combustion gas turbine power plant, of the type employed in stationary power generating equipment, wherein such dual fuel control system senses generated load as a factor of engine performance and wherein a fuel fired heater is used as the heat input means to the secondary heat transfer fluid.

FIG. 4 presents a functional block diagram, similar to FIGS. 1, 2 and 3 but showing application of the present invention to a diesel engine of the variable speed, variable load type driving a non-electric load, such as found in trucking and marine applications, wherein the dual fuel control system senses engine speed as a factor of engine performance affecting power output and incorporates a throttled heavy duty pump as the heavy fuel heater.

FIG. 4a is a functional block diagram similar to FIGS. 1–4, but illustrating application of the present invention to a diesel engine of the variable speed, variable load type wherein the dual fuel control system senses engine speed as a factor of engine performance, wherein the heavy heating means includes a fuel fired heater for heating secondary heat transfer fluid, wherein the changeover mechanism is of the hydraulic servo type, and wherein the heat control mechanism is of the hydraulic servo type.

FIG. 4b is a functional block diagram similar to FIGS. 1–4a but illustrating application of the present invention to a free-piston gas-generator-turbine power plant, wherein the dual fuel control system senses engine speed as a factor of engine performance, wherein the heavy heating means includes a fuel-fired heater for heating secondary heat transfer fluid, wherein the changeover mechanism is of the hydraulic servo type, and wherein the heat control mechanism is of the hydraulic servo type.

FIG. 4c is a functional block diagram similar to FIGS. 1–4b, but illustrating application of the present invention to a combustion gas turbine power plant, wherein the dual fuel control system senses engine speed as a factor of engine performance, wherein the heavy heating means includes a fuel-fired heater for heating secondary heat transfer fluid, wherein the changeover mechanism is of the hydraulic servo type, and wherein the heat control mechanism is of the hydraulic servo type.

FIG. 4d is a functional block diagram similar to FIGS. 1–4c but illustrating application of the present invention to a diesel engine wherein the dual fuel control system senses generated load as a factor of engine performance, wherein the heavy heating means includes a fuel-fired heater for heating secondary heat transfer fluid, wherein the changeover mechanism is of the hydraulic servo type, and wherein the heat control mechanism is of the hydraulic servo type.

FIG. 4e is a functional block diagram similar to FIGS. 1–4d but illustrating application of the present invention to a combustion gas turbine power plant, wherein the dual fuel control system senses generated load as a factor of engine performance, wherein the heavy heating means includes a fuel-fired heater for heating secondary heat transfer fluid, wherein the changeover mechanism is of the hydraulic servo type, and wherein the heat control mechanism is of the hydraulic servo type.

FIG. 5 presents a vertical side view, diagrammatic in character, with a portion of a manifold and manifold heater cut away, showing a typical diesel-electric power plant of the variable speed, variable load type commonly employed as the power plant in railroad locomotives, with a dual fuel control system of the type presented in FIGURE 1 installed.

FIG. 6 presents a vertical cross section view, with certain elements somewhat diagrammatic in character, illustrating a representative hydraulic-type dual fuel servo-control unit incorporating a speed responsive component assembly and a viscosity sensing component assembly, suitable for dual fuel control in a variable speed, variable load engine of the type presented in FIG. 5.

FIG. 7 presents a transverse cross section view through the laminar flow section of the viscosity sensing component assembly, taken along 7—7 of FIG. 6.

FIG. 8 presents an expanded side view of two representative laminar flow section elements, schematically presenting the manner in which said elements are stacked to develop the laminar flow section shown in FIGS. 6 and 7.

FIG. 9 presents in schematic form the fuel lines and hydraulically actuated valve system of the typical embodiment of the present invention illustrated in FIGS. 5 and 6; the various fuel and hydraulic fluid control lines being shown in single line for clarity of illustration.

FIG. 10 is a vertical cross section, with certain elements being illustrated in diagrammatic and schematic form, illustrating a portion of a further modified dual fuel control unit, for use in conjunction with a constant speed, variable load engine of the type conventionally employed in stationary power equipment driving an A.C. generator, such as presented in FIG. 3.

FIG. 10A is a schematic presentation of a D.C. generator circuit, showing the connection thereof to the variable load responsive unit shown in FIG. 10 and serving to adapt the same to variable speed, variable load use, such as for the type of power plant shown in FIG. 2.

Figure 4A:
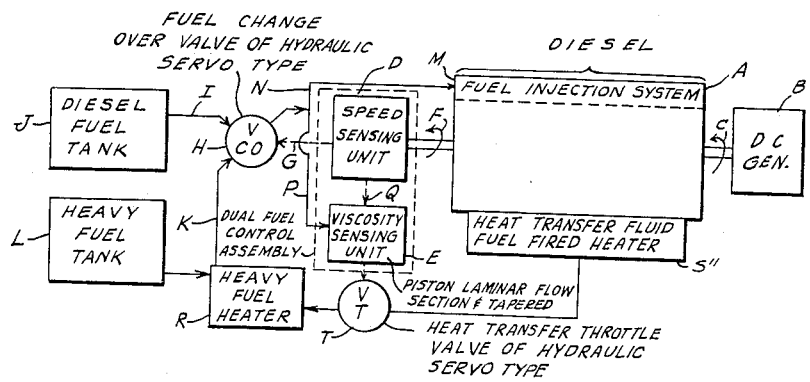

FIG. 11 illustrates, in side elevational view with certain parts in cross section, a typical dual fuel changeover valve and associated hydraulic actuating mechanism, such presentation also serving to illustrate the construction of the dual fuel return valve which is identical in construction with one section thereof, such valves constituting components of the dual fuel control system of the typical embodiment of the invention presented in FIG. 5.

FIG. 12 is a transverse cross section view of the valve elements of the dual fuel changeover valve illustrated in FIG. 11, with the valve orifices set for delivery of diesel fuel to the engine fuel injection system.

FIG. 13 is a transverse cross section view, corresponding to the cross section view of FIG. 12, showing the dual fuel changeover valve orifices set for delivery of heavy fuel to the engine fuel injection system.

FIG. 13A is a transverse cross section view of the dual fuel return valve, showing the orifices thereof set for return of diesel fuel to the diesel fuel tank.

FIG. 14 is a side cross section view of a typical heavy fuel heater control valve and associated hydraulically actuated control mechanism, constituting a further component of the fuel control system presented in FIG. 5.

FIG. 15 is a top partial view in cross section of the heavy fuel heater control valve illustrated in FIG. 14, presenting further details of the butterfly valve construction and valve actuating mechanism thereof.

FIG. 16 illustrates in composite a side and various transverse cross section views of the bayonet-type manifold heater functioning as a heat exchanger for heating the secondary heat transfer fluid by heat transfer from the manifold exhaust gases, shown as a component of the heavy fuel heating system illustrated in FIG. 5.

FIG. 17 illustrates, in side cross section view with certain elements diagrammatic in character, a modified form of secondary heat transfer fluid heater, wherein electrical heating is employed.

FIG. 18 presents, in diagrammatic form, a further modified form of secondary heat transfer fluid heater, comprising a fuel-fired steam generator.

FIG. 19 illustrates in vertical cross section view a modified form of dual fuel control unit, generally corresponding in function to the control units illustrated in FIG. 6, wherein the fuel changeover and heat throttle valves are electrically actuated and the speed responsive component assembly is magnetically actuated.

FIG. 20 presents a top, partial view of the contact arms of the dual fuel control unit illustrated in FIG. 19.

FIG. 21 schematically illustrates a further modified form of dual fuel changeover valve actuating mechanism, wherein said valve is pneumatically actuated.

FIG. 22 schematically illustrates a further modified form of heavy fuel heat control valve actuating mechanism, wherein said valve is pneumatically actuated.

FIG. 23 presents a vertical cross section view, illustrating yet another form of hydraulic dual fuel servo-control unit incorporating a speed responsive component assembly and a viscosity sensing component assembly, suitable for dual fuel control in a variable speed, variable load engine of the type presented in FIGS. 5 and 9 for example, with the connecting hydraulic control fluid lines and fuel feed and return lines indicated by arrows designated with like numerals and with certain interior elements corresponding in function to elements of FIG. 6 control unit being designated by corresponding prime numerals.

FIG. 24 presents a schematic diagram of the various fuel lines and hydraulic control fluid line connections for the dual fuel servo-control unit presented in FIG. 23, also showing the points of connection thereof to the fuel feed and return lines of the dual fuel system shown in FIGS. 5 and 9.

Figure 4E:
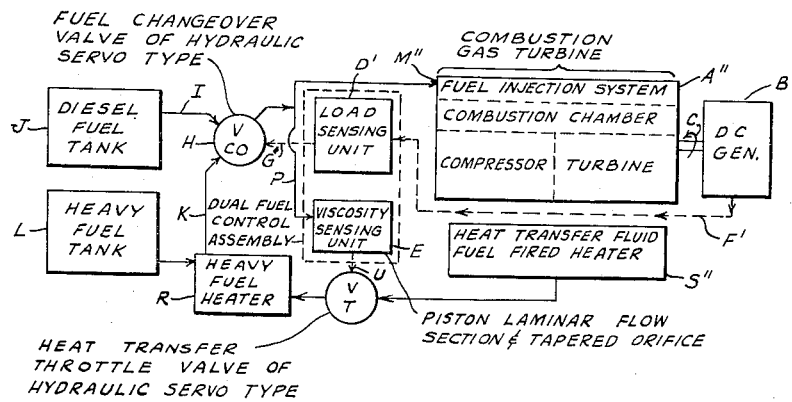
Figure 4B:
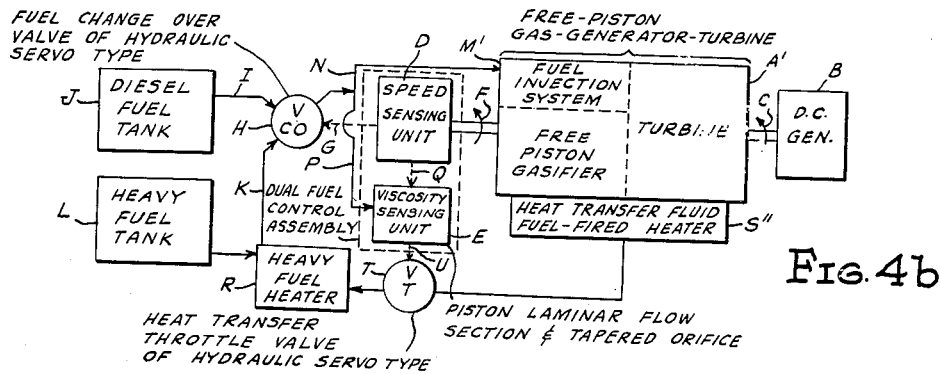
Figure 4C:
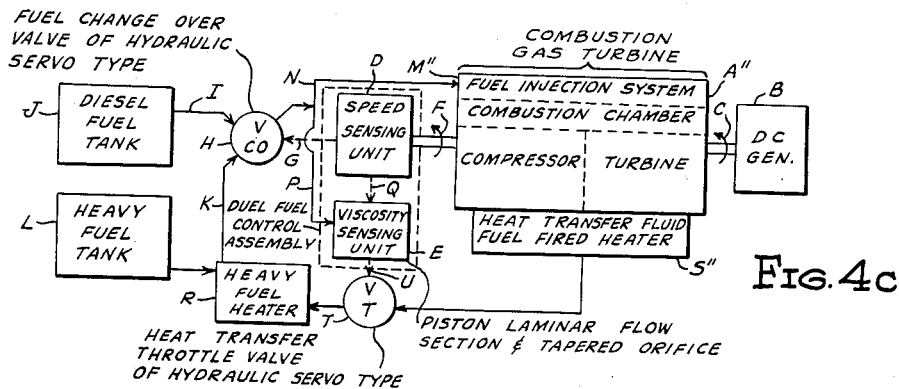
Figure 4D:
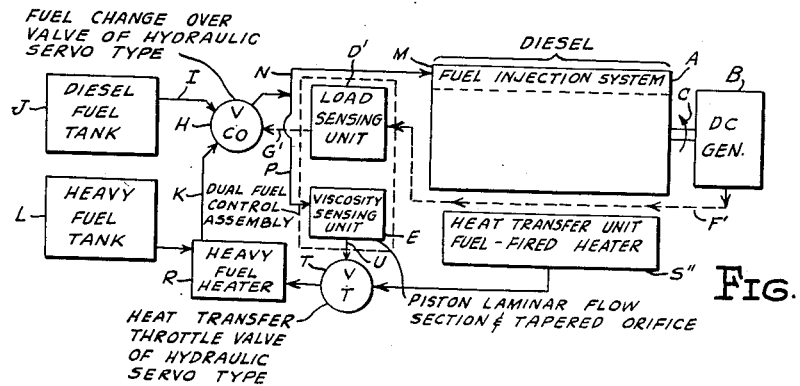

FIG. 25 illustrates a modified form of heavy fuel heater, of the type shown diagrammatically in FIG. 4, wherein the heavy fuel is heated by being circulated through a heavy duty pump driven by the engine, the output of such heavy duty pump being controlled by a throttle valve responsive to the viscosity sensing unit of the system.

FIGURES 1 through 4 serve to present by functional block diagrams various representative applications of the present invention, with return lines, pumps, relief valves, reservoirs and auxiliary heaters omitted for simplicity and clarity. The dual fuel system of the present invention functions to automatically deliver either diesel fuel or heated heavy fuel at an engine performance regulated viscosity to the fuel injection system of an engine burning diesel type fuel. Thus, the control system is equally applicable to power plants having as the prime mover either a compression ignition diesel engine, a free-piston gas fier driving a gas turbine, or a combustion gas turbine, since in all such instances the fuel injection system and other interior design characteristics of the engine need not be modified.

FIGURE 1 presents application of the present dual fuel control system to a variable speed, variable load diesel-electric power plant of the type widely employed in railroad locomotives, wherein the diesel engine A mechanically drives a direct current generator B in turn electrically connected to traction motors driving the drive wheels, such mechanical drive of the generator being indicated at C. According to the present invention, a dual fuel control assembly consisting of a speed sensing unit D and a viscosity sensing unit E is provided, the speed sensing unit D being mechanically driven by the diesel A, as indicated at F. Speed sensing unit D generates a control signal G which selectively positions changeover valve H to communicate either diesel fuel line I from diesel fuel tank J or heavy fuel line K from heavy fuel tank L to the fuel injection system M of diesel engine A through line N. A portion of the fuel being delivered through line N to fuel injection system M is taken off and delivered to the viscosity sensing unit E through line P. Speed sensing unit D also generates a control signal Q as an input to the viscosity sensing unit E.

As indicated, it is a primary purpose of the present invention to regulate the viscosity of the heavy fuel in response to a factor of engine performance reflecting power output thereof so that the heavy fuel may be efficiently combusted in a diesel type fuel burning engine. To this end the embodiments thereof presented in FIGURES 1 through 3 heat the heavy fuel in heavy fuel heater R by means of a secondary heat transfer fluid. In the form of the invention set forth in FIGURE 1, such secondary heat transfer fluid derives a heat input from manifold heater S through which the secondary heat transfer fluid is circulated in heat exchange relationship with the exhaust gases from diesel engine A, the flow of secondary heat transfer fluid from manifold heater S to heavy fuel heater R being regulated by a throttle valve T, the setting of which is determined by control signal U generated in viscosity sensing unit E. Thus, viscosity sensing unit E continuously monitors the viscosity of the fuel being delivered through line N to fuel injection system M of the diesel engine A and by output signal U appropriately controls throttle valve T to maintain the heavy fuel delivered to line K from heavy fuel heater R at an optimum value for efficient combustion, the regulation, as more fully explained hereinafter, being such that during engine speeds below and immediately above changeover from diesel to heavy fuel the heavy fuel is heated to a relatively high temperature and relatively low viscosity and is heated to a lesser degree and a relatively increased viscosity proportionately with further increases in speed of diesel engine A. This latter regulation occurs as a result of signal input Q to viscosity sensing unit E from speed sensing unit D.

As will be evident, certain components of other typical applications of the present invention, as presented in FIGS. 2 through 4, are identical with those employing the equipment assembly presented in FIGURE 1, and have accordingly been assigned like designation letters. Modified components and control signal inputs which are generally similar in function have been assigned corresponding prime or double prime letters in the following description of the modified fuel control systems presented in FIGS. 2 through 4.

In FIG. 2, the power plant employs as the prime mover a variable speed, variable load free-piston gas-generator-turbine engine A′ mechanically driving D.C. generator B as indicated at C, such power plant being also adapted for railroad locomotive installations, the fuel injection system M′ of the free-piston gasifier forming a conventional component of free-piston gas-generator-turbine A′. The dual fuel control system presented in FIG. 2 differs from that presented in FIGURE 1 in two important particulars. First, the factor of engine performance sensed by the dual fuel control assembly is generated load, the dual fuel control assembly incorporating a load sensing unit D′ rather than a speed sensing unit, the control signal input to load sensing unit D′ being indicated at F′. Load sensing unit D′ generates a changeover signal G′ for selective actuation of changeover valve H to deliver fuel through line N from either diesel fuel line I or heavy fuel line K to fuel injection system M′. Load sensing unit D′ also generates a control signal Q′ as an input to viscosity sensing unit E whose output signal U′ controls heat transfer throttle valve T. The second variant of the FIG. 2 assembly from that shown in FIGURE 1 is the utilization of a separately energized electric heater S′ as the secondary heat transfer fluid heater, the circulation between secondary heat transfer fluid electric heater S′ and heavy fuel heater R being throttled by heat transfer throttle valve T in turn responsive to control signal U′ from viscosity sensing unit E.

FIG. 3 presents yet another application of the present invention, the type of power plant involved being a constant speed, variable load system including a combustion gas turbine A″ mechanically driving an A.C. generator B′, as indicated at C, it being understood that combustion gas turbine A″ and A.C. generator B′ are conventional per se and of the type commonly employed in stationary power plant installations. In the fuel control system of FIG. 3, as in the fuel control system of FIG. 2, the factor of engine performance sensed for fuel changeover is generated load, such control signal being indicated at F″. In FIG. 3, the dual fuel control assembly is identical with that of the assembly shown in FIG. 2, and includes load sensing unit D′, generating from control input F″, a changeover valve control output G′ and a load factor output Q′ to viscosity sensing unit E. Fuel changeover valve H, as in the FIG. 2 assembly, selectively delivers diesel or heavy fuel from lines I or K through line N to fuel injection system M″ of the combustion chamber of combustion gas turbine A″ and through line P to viscosity sensing unit E. In the FIG. 3 assembly, yet another form of secondary heat transfer fluid heater is employed; specifically fuel fired heater S″, serving as a constant heat input to the secondary heat transfer fluid, the flow of which to heavy fuel heater R, as in the previous system, is throttled by heat transfer valve T under control of output signal U′ from viscosity sensing unit E.

The dual fuel control system presented in FIG. 4 is applied to a variable speed, variable load diesel engine A mechanically driving a non-electric load B″, such mechanical drive being indicated at C. As known, power plants of this type also find wide application in marine and trucking use, for example, and it will be readily understood that load B″ is any mechanical load as may be desired, such as a marine propulsion system, the drive mechanism of a roadway vehicle, or a gas compressor. The dual fuel control system used in FIG. 4 is identical with that employed in FIGURE 1 except that heavy fuel heater R′ utilizes no secondary heat transfer fluid but generates the appropriate elevated temperature in the heavy fuel delivered to line N by means of a heavy duty pump V mechanically driven by diesel engine A, as indicated at W, the output line Y from said heavy duty pump V being throttled by throttle valve T′ under control of the output signal U from viscosity sensing unit E. In operation, such heavy duty pump V in combination with throttle valve T′ is an effective heavy fuel heater R′ since the throttle valve T′ constitutes a constricted outlet for heavy duty pump V, the hydraulic pressures generated at the output of heavy duty pump V raising the temperature of the heavy fuel delivered to line N an amount determined by the instantaneous orifice dimension of throttle valve T′, higher heavy fuel temperatures and consequent lower viscosities thereof resulting when throttle valve T′ is relatively restricted.

From a consideration of the various typical equipment assemblies presented functionally in FIGURES 1 through 4, it will be seen that a dual fuel system according to the present invention can be applied to any type of power plant having an engine burning diesel-type fuel, such as a diesel-electric plant, a free-piston gas-generator-turbine driving a D.C generator, a combustion gas turbine driving an A.C. generator, or a diesel having a non-electric load. From these examples it will be evident that any of the engines presented can be combined with any of the types of loads presented. Thus the combustion gas turbine of FIG. 3 can be operated at variable speed with the variable load D.C. generator of FIGURES 1 or 2 or non-electric load of FIG. 4, for example, such a power plant for locomotive use being discussed in the articles cited above from Diesel and Power Transportation. Also, either the diesel engine of FIGURES 1 or 4 or the free-piston gas-generator-turbine of FIG. 2 can drive the non-electric load of FIG. 4 or can be operated at constant speed to drive the variable load A.C. generator of FIG. 3, it being understood that when the power plant installation is of the variable speed, variable load type the factor of engine performance reflecting power output sensed for fuel changeover and viscosity control can be either engine speed or generated load and that generated load is to be sensed when the power plant is of the constant speed, variable load type. Similarly, a characteristic dual fuel control system can utilize either secondary heat transfer fluid or direct heating of the heavy fuel, the heat input means for the secondary heat transfer fluid when employed being a heat exchanger with the exhaust gases of the engine, an electric heater, or a fuel fired heater, as desired. As will be further evident from the following more detailed consideration of various components of typical control systems, the servo-control signal outputs and associated equipment of the dual fuel control assembly can be hydraulic, pneumatic, and/or electric in character, rendering the basic system widely flexible and adaptable to deriving primary control power from the existing or readily installed standardized auxiliary equipment of the power plant.

Turning to a more specific consideration of a typical embodiment of the present invention, presenting an application thereof to a dual fuel control system for a variable speed, variable load diesel engine of the type commonly employed for railroad locomotive power, FIG. 5 presents in diagrammatic side view a diesel-electric power plant including a conventional diesel engine 20 (a 16 cylinder Model 567B Diesel illustrated in publication "Engineman's Operating Manual" first edition, February 1949, for Model F7 Locomotive) and certain conventional components thereof, such as electric generator 21, exhaust manifolds 22, governor assembly 23, supercharger 24, fuel injection valve system 25, diesel fuel tank 26, and throttle box 27 including hand throttle 27', the pilot valve and associated linkage being diagrammatically indicated at 28.

According to the present invention, a duel fuel system is provided including a dual fuel control assembly 30 having incorporated therein viscosity and speed responsive elements as hereinafter more specifically discussed in connection with the detailed illustration of said dual fuel control assembly 30 as presented in FIG. 6, the dual fuel system also including a heavy fuel tank 31 and heavy fuel heating means including heavy fuel heater 32, manifold heater 33, auxiliary heater 34, and associated control and fluid transfer conduits, all as more specifically set forth in the following description.

As previously indicated, one of the main purposes of the dual fuel control system of the present invention is to control selection of one of the two available fuels, the fuel selected being automatically determined by a factor of engine performance, such as engine speed or generated load, and to establish and maintain the heavy fuel at an appropriate viscosity by controlled heating thereof to provide efficient fuel combustion, all without requiring manual control of the fuel changeover or heavy fuel heating by the engine operator. As also previously indicated, a dual fuel control assembly according to the present invention controls selection of diesel fuel for the lower power output operating range, and appropriate preheating and selection of the heavy fuel when engine performance as reflected by engine speed or generated load is such that the heavy fuel can be delivered to the engine, i.e. during the high power output operating range.

In the first embodiment of the invention to be discussed, fuel changeover is accomplished through servo control exerted by the speed sensing unit on a hydraulically actuated changeover valve in the fuel delivery lines, and controlled heating of the heavy fuel is likewise accomplished through servo control exerted by the viscosity sensing unit and speed sensing unit on a throttle valve controlling the circulation of secondary heat transfer fluid. The detailed arrangement of the control valves and fuel lines will be considered first, with particular reference to the components of the control system indicated in FIG. 5 and schematically presented in FIG. 9, following which detailed consideration will be given to the typical dual fuel control assembly 30, as cross-sectionally presented in FIG. 6.

Diesel transfer pump 50, together with spring loaded by-pass valve 51, supplies diesel fuel at constant pressure to line 52 from diesel fuel tank 26, the direction of flow being indicated at 53. Similarly, heavy fuel transfer pump 54, together with spring loaded by-pass valve 55 supplies the fuel at constant pressure to line 56, the direction of flow being indicated at 57.

When engine 20 is operating on diesel fuel, pump 50 supplies diesel fuel from diesel fuel tank 26 to a dual fuel changeover valve 60 (shown in further detail in FIGS. 11 through 13). The diesel fuel passes through valve 60 and, under such condition of operation, is delivered through fuel line 61 to the fuel injection valve system 25, the excess diesel fuel not used for injection being returned through line 62 to fuel return transfer valve 63, identical in construction with one section of dual fuel changeover valve 60, then is returned to diesel fuel tank 26 through lines 64 and 65, the direction of flow thereof being indicated at 66.

When the engine is operating on heavy fuel, pump 54 supplies heavy fuel through line 56 to heavy fuel heater 32, the fuel outlet of which is connected through line 67 to dual fuel changeover valve 60, the heavy fuel thereby being delivered through line 61 to the fuel injection valve system 25, with excess heavy fuel being returned through return line 62 to fuel return transfer valve 63, then returned through heavy fuel return lines 68 and 69 to the heavy fuel tank 31, the return direction of flow being indicated at 70. In connection with the diesel and heavy fuel flow paths indicated, it will be noted that return paths from dual fuel changeover valve 60 are also provided to enable complete return of the circulating fuel not being delivered to the fuel injection valve system 25, the return path for the diesel fuel being lines 71 and 65, and the return path for the heavy fuel being lines 72 and 69.

Prior to the heavy fuel being delivered to the fuel injection valve system 25 of engine 20, the fuel is heated to the required lower viscosity by heavy fuel heating means comprising heavy fuel heater 32. The embodiment of the invention illustrated in FIG. 5 advantageously utilizes the high temperature exhaust gases from the engine itself and adopts a novel type manifold heater 33 through which is circulated a non-oxidizing high boiling point heat transfer fluid capable of withstanding the high input temperatures encountered in exhaust manifold 22. Such heat transfer liquid may be a fluid such as tetrachlorobiphenyl or an eutectic mixture of 26.5% diphenyl and 73.5% diphenyloxide, or other similar commercially available non-oxidizing liquid having a boiling point range of at least 300–700° F. In the heavy fuel heating system presented, bayonet-type, return pass manifold heater 33 has circulated therethrough such heat transfer liquid, circulation being accomplished by transfer pump 82 in the direction indicated at 80 and 81, the circulation of the heat transfer fluid also being through an auxiliary heater 34 on the inlet line 83 side of manifold heater 33, as desired. Flow from the outlet side of manifold heater 33 through line 84 is to a spring pressed by-pass valve 85, connected to the suction side of transfer pump 82, the overpressure by-pass line 86 delivering the heat transfer fluid in the direction of flow indicated at 87 through heat transfer coil 88 situated in the heavy fuel tank 31, said heat transfer coil 88 and auxiliary heater 34 serving to raise the initial temperature of the heavy fuel and thereby reduce its viscosity sufficiently to permit ready circulation of the heavy fuel through the system by heavy fuel transfer pump 54. The underpressure side of by-pass valve 85 is connected through line 90, thence through heavy fuel heat control valve 91, shown in greater detail in FIGS. 14 and 15, thence to the heat exchange coil 32' in heavy fuel heater 32, which is of generally conventional coil and sleeve design, the outlet line 92 from said coil 32' being connected to return line 86 to complete the heat transfer fluid flow circuit, the direction of flow being indicated at 87. The heat transfer fluid flowing through line 90 also passes through a thermostatic cutoff valve 93, which operates in conjunction with heavy fuel thermostat 94 placed in the heavy fuel discharge side of heavy fuel heater 32 to close line 90 and protect the heavy fuel against cracking in the event of thermal overload.

Returning to a more detailed consideration of the bayonet manifold heater 33, particularly as illustrated in side and various transverse cross section views in FIG. 16, manifold heater 33 is shown installed in the rear exhaust manifold 22 of engine 20, a portion of the rear exhaust manifold 22 and heater 33 being broken away to more clearly show the construction of this heat exchange unit. Closing the manifold inner area is heater faceplate 95, provided with a leak indicating orifice 96 from which the heat transfer fluid is discharged in the event of internal leak in the return bend element. It will of course be readily apparent that external manifold heater leaks can be easily detected by smoke caused thereby in the engine exhaust gases. The streamlined shape of bayonet manifold heater 33 (see FIG. 16) minimizes manifold back pressure. It will be evident that the so-called manifold heater, deriving a heat input from the engine exhaust gases, can be placed at any convenient location anywhere along the discharge flow path of the exhaust gases, can advantageously employ a fuel-fired after-burner (FIG. 1) in the exhaust gas flow path ahead of the heat exchanger, and can be constructed according to any standard heat exchanger design type to circulate the heat transfer fluid through a straight pipe, a multiple return bend pipe or a coil, as desired.

Manifold heater 33, heavy fuel heater 32, and thermostatic cut-off valve 93 are appropriately designed to establish the heat input rate and rate of flow of the heat transfer fluid at values whereby the heat input rate to the heavy fuel in heavy fuel heater 32 will not permit the temperature of the heavy fuel to exceed its cracking temperature. In this regard, it has been determined that with a fuel line pressure of at least 40 p.s.i. the practical upper limit of heavy fuel temperature is about 275–285° F., which maximum heavy fuel temperature has been determined by actual tests as being satisfactory for efficient combustion of heavy bunker-type fuel of 4200 Saybolt Universal seconds (SUS) normal viscosity in a diesel engine of standard design. As a practical limit, the normal viscosity of the heavy fuel may be as high as approximately 5000 SUS and still operate satisfactorily in the fuel system of the present invention within the indicated maximum heavy fuel heater temperature range. It will be readily understood that in a given installation the permissible maximum heavy fuel temperature will be determined according to the type of heavy fuel employed, by the design characteristics of the engine, and by the minimum fuel line pressure encountered by the heavy fuel at maximum heat, the tendency thereof to vapor lock at a given temperature obviously being less at a higher line pressure than at a lower line pressure.

Auxiliary heat transfer fluid heater 34, which can be of any suitable type whereby a constant heat input is imparted to the secondary heat transfer fluid from any external source such as the engine cooling water or auxiliary steam generator, also serves as a storage and expansion chamber for the heat transfer fluid. Such constant heat input auxiliary heater 34 desirably contributes a substantial portion of the necessary heat input for the heat transfer fluid, since such auxiliary heat source in effect reduces the necessary heating capacity of manifold heater 33 and provides a ready source of standby or initial heat to facilitate circulation of the heavy fuel through heavy fuel heater 32 and changeover valve 60 during the starting and initial low power output phases of engine operation. However, it will be apparent that a second or auxiliary source of additional heat in the heat transfer fluid circuit is not essential to the fundamental concepts of the present invention, since all of the heat input to the heavy fuel can be derived from one heater, such as manifold heater 33, as desired.

In connection with the secondary heat transfer fluid circulation system it is also to be again noted that various other types of heating means can be employed in lieu of manifold heater 33, such as the electrical heating means illustrated in FIG. 17 and the steam generator illustrated in FIG. 18, each discussed more fully hereinafter. It will be further apparent that the secondary heat transfer fluid for heating the heavy fuel heater 32 can advantageously be steam, generated in a manifold gas heat exchanger, such as heater 33, or generated in a separately controlled heater such as the electrical heating means shown in FIG. 17 or the steam generator shown in FIG. 18. One example of this latter type of heating means is Steam Generator Model OK-4630 installed as auxiliary equipment in Model F7 General Motors Corporation diesel locomotives as shown in publication Engineman's Operating Manual for Model F7 Locomotives, first edition, February 1949.

Having considered the various fuel delivery and return lines and the heavy fuel heater system, consideration will now be given to the dual fuel control assembly 30 and the fuel system control exerted thereby to accomplish the mode of operation contemplated by the present invention.

One typical form of dual fuel control assembly is hydraulically operated and is illustrated in schematic cross section in FIG. 6 with the elements thereof shown in stopped position. A by-pass line 100 from fuel line 61 (also see FIG. 5) directs part of the fuel going to the engine to a viscosity sensing assembly, it being recalled that the fuel in line 61 is under constant pressure by reason of transfer pump 50 or transfer pump 54 and respectively associated by-pass valve 51 or 55, as the case may be. Said viscosity responsive assembly comprises an inlet radius tap line 101, a constricted standard orifice 102, an intermediate radius tap line 103, a laminar flow section comprising a plurality of stacked laminar flow elements 104 and an outlet radius tap line 105. The viscosity responsive assembly further comprises a first piston 106 and associated compression spring 107, threaded packing gland nut 108, and piston rod 109 connected between said piston 106 and balancing bar 110, the latter connection being by fixed pin 111. The viscosity responsive assembly additionally comprises a second piston 114, compression spring 115, threaded packing nut 116, and piston rod 117, the latter also being provided with a fixed pin 118 engaging an elongated slot 119 in balancing bar 110 to allow said balancing bar 110 to operate in an arc, the relative downward position thereof at inner extremity 120 being proportional to the viscosity of the fuel delivered to line 100, as hereinafter more fully discussed.

Again recalling that fuel delivered to line 100 from changeover valve 60 is under constant pressure in normal operation, the pressure differential between radius tap lines 101 and 103, caused by constricted standard orifice 102, is primarily directly proportional to the density of the fuel, and the laminar flow section comprising stacked elements 104 provides a further differential pressure between radial tap lines 103 and 105 which is in turn primarily directly proportional to the viscosity of the fuel in line 100. To provide the desired actuation of balance bar 110, radius tap line 101 is in communication with upper cylinder chamber 121, the fluid pressure therein acting on piston 106, and radius tap line 103 is in communication with upper cylinder chamber 122, the fluid pressure therein acting on piston 114, while outlet radius tap line 105 is connected to lower cylinder chambers 123 and 124, the fluid pressure therein acting on pistons 106 and 114, respectively, as indicated. By such arrangement, for practical purposes the relative position of piston rod 109 associated with piston 106 is determined according to the density of the fuel, and the relative position of piston 114 is determined by the viscosity of said fuel. Such dual actuation of balance bar 110 as illustrated in FIG. 6 is a refinement in design which provides automatic safeguard against variations in fuel density, which on occasion is an important consideration when continuing operation involves successive use of heavy fuels of respectively different characteristics.

It will be apparent to those skilled in the art that the single viscosity responsive piston 114 and associated assembly can be connected directly to the hydraulic control sleeve 130 of the control valve mechanism hereinafter considered in detail, and that piston 106 and associated assembly can be eliminated in the event the resulting simpler construction is preferred over the additional control features presented, since the position of piston 114 under all normal circumstances represents a sufficiently accurate measure of the viscosity of the fuel passing through the laminar flow section comprising stacked elements 104 when the pressure drop between tap lines 101 and 105 is found to be sufficiently constant under normal conditions of operation as encountered in a given installation.

To provide a more complete understanding of the laminar flow section comprising stacked elements 104, reference is made to FIGS. 7 and 8, respectively presenting a transverse cross section of the laminar flow section and a partial expanded view of two of said stacked elements 104. In FIG. 7, it is seen that stacked elements 104 are alternately arranged to provide a plurality of narrow passages sensitive to viscous pressure drop. As seen in the expanded view of FIG. 8, such thin passages are provided, in the typical laminar flow section shown, by a series of stacked elements, two being shown at 104 and 104', each having provided therein a longitudinally extending slotted section as indicated at 125 and 125'. When a given element 104 is stacked in association with a similar element 104' arranged with its slotted portion 125' in an opposite direction to slotted portion 125, the requisite narrow passages through slotted portions 125' and 125 are developed. From the foregoing it will be apparent that the entire laminar flow section of the viscosity sensing assembly is built up from a series of such oppositely arranged stacked elements 104 and 104', and that such laminar flow section is sensitive to viscous pressure drop to develop a proportional pressure differential between radius tap lines 103 and 105.

Returning to a further consideration of the viscosity responsive elements illustrated in FIG. 6, the inner end 120 of balancing bar 110 is in constant contact with hydraulic control sleeve 130 through adjustable ballpoint contact 131 by the pressure exerted by light spring 132. Ballpoint contact 131 is, as illustrated, adjustable by thread means giving close adjustment of the positional relationship of orifices 132, 133 and 134 with piston valve 135. As indicated, the position of piston valve 135 and hydraulic control sleeve 130, as illustrated in FIG. 6, is with the engine and the dual fuel control assembly in non-operating condition, i.e. stopped.

When the engine 20 is started, piston valve 130 is lowered only a relatively small amount due to the fact that the engine at starting and idling speeds is operated on relatively low viscosity diesel fuel.

As the engine is started and reaches its idling or slowest operating speed all transfer pumps are in operation with the heat transfer fluid being heated by the manifold heater 33 and the auxiliary heater 34, the heat transfer fluid being further circulated through the heavy fuel tank 31 to cause a partial reduction in the viscosity thereof rendering it easier to pump through the fuel system. Also, heavy fuel transfer pump 54 is pumping the heavy fuel through heavy fuel heater 32, through dual fuel cut-off valve 60, and back through lines 72 and 69 to the heavy fuel tank 31.

As the engine starts, drive shaft 150 is rotated as indicated at 150' by suitable drive mechanism from a rotating engine component such as the cam shaft or a belt pulley, causing the gear pump comprising gears 151 and 152 to pump hydraulic control oil from sump 153 through lines 154 and 155 to hydraulic control oil accumulator 156, provided with overpressure return line 199. Shaft 157 is driven by gear 152 of the hydraulic control oil gear pump, causing gears 158 and 159 to rotate a speed responsive subassembly keyed to gear 159. Said speed responsive subassembly comprises adjustable weights 160 and 161 on pivotally mounted arms 162 and 163, the centrifugal force through rotation thereof acting on integral arms 164 and 165 and exerting downward pressure against calibrated speeder spring 166 abutting casing 167 and adjustable flange 168, said flange being adjustably retained on shaft 169, which is thereby moved in a downward direction proportional to the speed of rotation of gear 159. Shaft 169 mounts piston valve 170 and aforementioned piston valve 135, which are positioned, as apparent from the described construction, according to the speed of the engine, a relatively lower position being maintained for relatively higher engine speeds.

At idling speed piston valve 170 with respective upper and lower lands 171 and 172 establishes the following hydraulic condition. Hydraulic control oil is flowing from the pump comprising gears 151 and 152 to accumulator 156, then through line 180 in assembly body 181 to the inner control area of piston valve 170. It is to be again noted parenthetically that piston valves 170 and 135 are illustrated in FIG. 6 in stopped position and will both attain relatively lower positions under running conditions. The hydraulic control oil then passes from line 180 through valve 170 and line 182 to the inner head chamber 186 of a dual fuel changeover valve control assembly 183 comprising piston 184 and cylinder 185, the hydraulic control oil in the outer head chamber 186' being free to return through line 187, the outer control space 188 and orifice 189 in shaft 169 into the passage which extends axially through said shaft into hydraulic control sleeve 130, thence outwardly through orifices 130' into chamber 140 and through a suitable drain line 190 to sump chamber 153.

Piston 184 of fuel changeover valve control assembly 183 is connected through shaft 191 to the actuating mechanism of dual fuel changeover valve 60, as explained in greater detail hereinafter in connection with FIGS. 11–13.

As set forth above, shaft 169 also mounts piston valve 135, which operates in conjunction with hydraulic control sleeve 130 to control the relative position of the heavy fuel heat control valve actuating mechanism 200 in the following manner. With the engine running at idle or low speed, hydraulic control oil flows from accumulator 156 through line 180 and line 201 through orifice 132 across the control chamber extending between lands 195 and 196 of piston valve 135 through orifice 133 and line 202 to the inner head chamber 203 of piston 204 of the heat control actuating mechanism 200, said latter mechanism further comprising cylinder 205 and a dashpot mechanism comprising piston 206 on shaft 207 connected at one end to piston 204 and at the other end to a piston 206. Each end of cylinder 208 is interconnected by line 209 to provide closed circuit flow for hydraulic fluid filling chamber 210 of the dashpot mechanism, the rate of flow of the dashpot hydraulic fluid being adjustably controlled by needle valve assembly 211, thus preventing sudden movement of piston 204 in the event of a sudden change in engine speed and counteracting the response time occasioned by the circulation of secondary heat transfer fluid to the heavy fuel heater 32. In the low speed condition of operation of the dual fuel control assembly 30, line 212 connects chamber 203' at the outer end of piston 204 in cylinder 205 with orifice 134 in control sleeve 130 and provides the return path for the hydraulic control fluid and is open to return of said control fluid to sump 153 through chamber 140 within which balance arm 110 is located (FIG. 6) and then through return line 190.

Shaft 213, connected to piston 204 in heat control actuating mechanism 200, is also connected, as shown in greater detail in FIG. 14, to the actuating mechanism for heat control valve 91.

*Operation*

Considering the mode of operation of the embodiment of the present invention illustrated in FIGS. 5–9 and 11–16, and with particular reference to FIGS. 5, 6 and 9, it will be understood that when the engine is started in the usual manner on diesel fuel, the dual fuel control assembly 30 is established at idling condition, with control sleeve 130 in a somewhat lower position than illustrated in FIG. 5 and with shaft 169 mounting piston valves 135 and 170, also being established in a somewhat lower position, thus providing for delivery of the hydraulic control oil under pressure to lines 182 and 202 of the fuel changeover mechanism 183 and heat control valve actuating mechanism 200, respectively, which condition establishes dual fuel changeover valve 60 in position for delivering diesel fuel to the fuel injection system 25 and establishes heavy fuel heat control valve 91 in relatively open position by communication of line 201 with line 202 through sleeve orifices 132 and 133 and valve 135, providing a relatively high temperature and relatively great reduction of viscosity of heavy fuel in heavy fuel heater 32, ballpoint contact 131 being adjustable on sleeve 130 to establish this position of sleeve 130 at idling speed. With throttle valve 220 of valve 91 relatively open, a maximum flow of secondary heat transfer fluid is established, the flow path thereof being through manifold heater 33, though heating coil 88 in heavy fuel tank 31, and through auxiliary heater 34, the heated heavy fuel from heater 32 being by-passed through changeover valve 60 and lines 72 and 69 and thus returned to heavy fuel tank 31. This operating condition, whereby the heavy fuel oil in heavy fuel heater 32 is heated to its higher temperature under idling conditions, is a consideration important to the present invention, since heavy fuel at its lowest viscosity equilibrium point is thereby rendered immediately available to the fuel injection system at the changeover speed.

In normal operation, after a reasonable warm-up period, throttle 27' of conventional eight-notch throttle box 27, diagrammatically shown in FIG. 5, is advanced to the second notch position, resulting in weights 160 and 161 moving farther out to a new position, forcing piston valve shaft 169 downwardly. However, the distance shaft 169 moves downwardly is insufficient to cause any change in the dual fuel changeover valve actuating mechanism 183 or the heat control valve actuating mechanism 200, since it is advantageous to achieve a somewhat higher engine speed prior to changeover to heavy fuel. It will be evident, however, that changeover to heavy fuel can take place at any desired intermediate speed, such as at the third, fourth or fifth notch speed, such selection merely involving design considerations and appropriate adjustment of the speed sensing unit and valve 170.

For purposes of the first example presented, the third notch throttle position, i.e. three-eighths maximum speed, has been selected as the dual fuel changeover point, since this approximate fraction of maximum power load has been established by extensive study to be most advantageous in terms of achievement of satisfactory combustion conditions for the heavy fuel without substantial danger of cracking of the heavy fuel by excess heating.

At the third notch speed, i.e. the dual fuel changeover point, the following control sequence occurs. Because of the increase in engine speed, the weights 160 and 161 move outwardly still farther, causing piston valve shaft 169 carrying valves 135 and 170 to move farther downwardly. The downward motion of piston valve 170 causes the upper land 171 thereof to place line 182 in communication with upper return orifice 192 in shaft 169 and releases the hydraulic control fluid contained in chamber 186 of fuel changeover actuating mechanism 183, the lower land 172 of piston valve 170 meanwhile placing line 187 in communication with the interior control area 186' of piston valve 170, which is also in communication with line 180 and the hydraulic control oil under pressure in accumulator 156, which latter pressure is contributed by piston 193 maintained in spring pressed condition by compression spring 194 against the pressure force of the hydraulic control oil from the gear pump comprising gears 151 and 152. Thus, the hydraulic pressure of the pump comprising gears 151 and 152 and the accumulator 156 forces the hydraulic control oil through line 187 into chamber 186' and forces piston 184 in actuating mechanism 183 toward the inner end of cylinder 185, the hydraulic control oil on the inner side of piston 184 in chamber 186 being forced through line 182 and orifice 192 in shaft 169 and returned to sump 153 as previously described, the change in position of piston 184 causing dual fuel changeover valve 60 to be transferred from the diesel fuel delivery condition illustrated in FIG. 12 to the heavy fuel delivery condition illustrated in FIG. 13 by respective quarter rotation of valves 230 and 231 through quarter rotation of pinions 232 and 233 by rack gear 234 connected to shaft 191 of actuating mechanism 183 by suitable pin means as indicated at 235. Fuel return transfer valve 63, shown in FIG. 13A, is simultaneously transferred to connect return line 62 with return line 68 leading through line 69 to the heavy fuel tank 31 by actuating mechanism 97 corresponding in construction with actuating mechanism 183 and connected in parallel thereto by hydraulic control lines 98 and 99 respectively communicating wth lines 182 and 187, as shown by FIGS. 5 and 9 and the parenthetical numeral designations in FIG. 11.

Thus, the heavy fuel, previously heated to the maximum temperature in heavy fuel heater 32 and recycled to heavy fuel tank 31, at changeover speed flows through dual fuel changeover valve 60 through line 61 to the fuel injection valve system 25 and also flows through line 100, constricted orifice 102, the laminar flow section comprising stacked elements 104, and return line 100' of the viscosity sensing assembly. After changeover to heated heavy fuel, the diesel fuel previously delivered through the fuel injection valve system 25 correspondingly continues to be available at and is by-passed through dual fuel changeover valve 60 back to the diesel fuel tank 26 through return lines 71 and 65, as shown in FIG. 13.

At the fuel changeover point, no change occurs in the control condition with respect to heavy fuel heater control valve actuating mechanism 200 because of the following conditions. As piston valve shaft 169 moves farther downwardly with increase in speed to the fuel changeover point due to weights 160 and 161 moving farther outwardly, piston valve 135 also moves downwardly. Also, as the engine is changed over to heavy fuel, balancing bar 110 is lowered a small amount, which movement is approximately the amount of downward movement of piston valve shaft 169 when the speed is increased to the changeover speed. This action results from the fact that the viscosity of the heavy fuel, although at its lowest point, is still somewhat higher than the viscosity of the diesel fuel previously passing through the viscosity sensing mechanism. By predetermined design of piston valve 135, lands 195 and 196, and the associated orifices 132 through 134, the hydraulic control oil flow pattern is not changed, throttle valve 220 remains fully open, and the heavy fuel oil heater 32 continues to receive full flow of the heat transfer fluid from line 90, thus maintaining the lowest heavy fuel viscosity equilibrium point for the system.

Thus, the new position of hydraulic control sleeve 130 and the position of piston valve 135 produces a pressure equilibrium condition as a result of which piston 204 in heat control valve actuating mechanism 200 is not moved, since orifices 133 and 134 in hydraulic control sleeve 130 are closed off by the respective upper and lower lands 195 and 196 of piston valve 135 and oil cannot flow through lines 202 and 212, and the same heat input rate to heavy fuel heater 32 is preserved because the flow rate of the heat transfer liquid from line 90 through heat control valve 91 is unchanged. From this it follows that since the heavy fuel coursing heavy fuel heater 32 is delivered to the fuel injection valve system 25 at a substantially constant temperature, the viscosity thereof also remains substantially constant, which condition, as previously indicated, may be termed the heavy fuel viscosity equilibrium point for the engine at notch three speed.

As the speed of the engine is further increased and varied above the fuel changeover point, any changes in the viscosity requirement of the heavy fuel occasion a corresponding change in the heavy fuel viscosity equilibrium point. Movement of hydraulic control sleeve 130 and the selective delivery of the hydraulic control oil through either line 202 or 212 to the cylinder 205, causes a corresponding increase or decrease in the heavy fuel oil temperature, thus re-establishing the appropriate viscosity equilibrium point for the changed condition of operation.

From the foregoing it will be readily understood that the lower the piston valve 135 travels as a consequence of increase in engine speed, the higher the viscosity of the heavy fuel oil will be, since control sleeve 130 thereupon establishes piston 204, as viewed in FIG. 2, in a relatively left-hand position through flow of hydraulic control oil from valve 135 through orifice 134 until the increased viscosity resulting from reduced heating of the heavy fuel in heavy fuel heater 32 results in corresponding downward repositioning of control sleeves 130 to the equilibrium point where the respective lands 192 and 193 of control valve 135 again block orifices 133 and 134 of control sleeve 130.

The above speed responsive regulation of the viscosity of the heavy fuel is consistent with the previously stated fact that combustion of the heavy fuel becomes less difficult at the higher power output levels and that the heavy fuel accordingly can be of relatively higher viscosity consistent with the continuing requirement for an adequate fuel spray to enable satisfactory ignition and combustion. Thus, as the engine speed increases the viscosity of the heavy fuel can and must, for maximum efficiency, also increase, which control action is provided by the dual fuel control assembly presented.

To establish this point with more particularity, it will be seen that when the engine throttle is further advanced from the fuel changeover point to the fourth notch, for example, the engine further increases in speed with weights 160 and 161 swinging farther outwardly due to the increased centrifugal force being exerted. This action forces piston valve shaft 169 farther downwardly to a lower position and, consequently, piston valve 135 moves downwardly also. This change in position of piston valve 135 in turn causes orifice 133 to be opened to the upper side of the upper land 195 of piston valve 135, which is a non-pressure chamber. Hydraulic control oil can then flow from the inner cylinder area 203 of the heat control valve actuating mechanism 200 through line 202 when any movement of piston 204 occurs. Meanwhile, orifice 134 is opened to the inner or pressure chamber of piston valve 135 and the hydraulic control oil then flows from accumulator chamber 156 through line 212 to the outer chamber 203' of cylinder 205, thus causing inward movement of piston 204 and corresponding rotation and partial closure of butterfly valve 220 (see FIGS. 14 and 15) through connection of shaft 213 by pin 221 to rack 222, driving pinion 223, in turn mounted on shaft 224, and also mounting said butterfly valve 220, it being understood that the heat control valve 91 also comprises a suitable housing 225 provided with a packing gland 226 and packing nut 227 as well as a mounting bracket 228 for the actuating mechanism 200.

With partial closure of butterfly valve 220 with further increase of speed above changeover, as set forth above, the flow rate of the heat transfer fluid flowing to the heavy fuel heater 32 is reduced by the throttling action of butterfly valve 220, thus reducing the heat transferred to the heavy fuel passing through heavy fuel heater 32 and effecting a relative increase in the viscosity thereof. Accordingly, heavy fuel of relatively increased viscosity enters the viscosity sensing unit, the relative pressure drop between radius tap 103 and radius tap 105 increases, causing piston 114 to move downwardly which repositions balancing bar 110 and hydraulic control sleeve 130 to establish a new heat input rate for the new position of piston valve 135, the new heavy fuel viscosity equilibrium point being maintained until the speed condition is again changed.

Each speed change requirement established by notches 5, 6, 7, and 8 of the hand throttle 27' correspondingly establish different heat input rates for the heavy fuel and the corresponding heavy fuel viscosity equilibrium points are maintained indefinitely by the control valve mechanism comprising valve 135 and hydraulic control sleeve 130 by automatic readjustment thereof.

Conversely, reductions in speed above the fuel changeover point will result in the automatic establishment of corresponding lower viscosity equilibrium points, and the servo control action effected through valves 135, 170 and hydraulic control sleeve 130 automatically restore the engine to operation on diesel fuel at speeds below said changeover point.

Having specifically considered the construction and mode of operation of the embodiment of the invention set forth in FIGS. 5 through 9 and 11 through 16, consideration will be given to a comparison thereof with the corresponding block diagram of FIGURE 1, to illustrate the servo nature of the signal inputs and changeover and throttle valve controlling outputs thereof. Speed sensing unit D of FIGURE 1 finds its counterpart in the control assembly of FIG. 6 in those elements rotated by shaft 157, it being understood that engine speed indicating signal input F of FIGURE 1 is derived from rotation of shafts 150 and 157, as indicated at 150'. Output control signal G for selectively positioning changeover valve H corresponds to the hydraulic control fluid pressure differential existing between the hydraulic control fluid in lines 182 and 187. The servo nature of this changeover valve controlling output arises from the fact that the energy exerted through the hydraulic control fluid in line 182 or 187 is derived from the control fluid pump (gears 151 and 152) and spring 194 of accumulator 156, a reservoir of hydraulic control fluid being maintained in the latter at any desired predetermined pressure, say 150–200 p.s.i. Thus, in repositioning the changeover valve 60, the rotating, speed responsive elements shown in FIG. 6 need not generate any of the energy necessary for such changeover, but need generate only sufficient energy to move control valve shaft 169 downwardly the necessary distance, which force by predetermined design can be readily established at an order of magnitude of an ounce or even less. This stepup of the control energy by a force amplification factor of several thousand is characteristic of a hydraulic servo system and as a result thereof the control exerted by small changes in energy output of the speed sensing unit is reflected in large changes in changeover valve controlling energy, with considerably more speed change sensing accuracy, sensitivity and stability than would be the case if the changeover valve were repositioned by energy generated entirely by the speed sensing elements.

Similarly, the speed responsive signal input, in positioning shaft 169, also positions valve 135, and the control signal generated by the viscosity sensing elements and positioning sleeve 130 need be of only a small order of magnitude as compared with the pressure of the hydraulic fluid in accumulator 156 selectively generating a pressure differential or pressure equilibrium in the hydraulic control fluid in lines 202 and 212. The positioning of valve 135 by the speed sensing unit constitutes signal output Q to the viscosity sensing unit E. The pressure differential or pressure equilibrium of the hydraulic control fluid in lines 202 and 212 constitutes the heat transfer throttle valve positioning control output U from viscosity sensing unit E. Thus, the dual fuel control assembly presented in FIG. 6 generates from small changes in input energy output signals at higher energy levels. Such servo control effectively isolates the engine speed and fuel viscosity sensing elements from the friction drag of the fuel changeover and heat transfer fluid throttle valves, rendering said speed and viscosity sensing elements markedly more sensitive, more accurate and more stable in operation than would otherwise be the case.

Further consideration will now be given to alternative arrangements for heating the secondary heat transfer fluid utilized for heat exchange in the heavy fuel heater. One such modification is by a suitable electrical heating arrangement such as shown in block diagram form in FIG. 2 at S' and illustrated in diagrammatic cross section in FIG. 17, which provides electrical heating rather than exhaust manifold heating, the electrical heating assembly including a heating chamber 250 having provided therein a plurality of immersion electric heaters 251 around which the heat transfer fluid circulates, inlet line 252 of the electrical heater being connected at the high pressure end of transfer pump 82 in FIG. 5, with the outlet line 253 thereof being connected directly to line 84, the electrical heater unit thus substituting for both auxiliary heater 34 and manifold heater 33 in the system. When the secondary heat transfer fluid heater is electrically heated and when the power plant includes an electric generator, as in FIG. 2, it will be obvious that the heater energization can be advantageously and most conveniently obtained directly from the power plant generator.

In the electrical heating unit presented in FIG. 17, a thermostatic control unit 254 in outlet line 253 is provided as a further safety feature against thermal overload, said thermostatic control unit 254 being conventional per se and actuating a breaker switch 255, also conventional per se, in series with the immersion type heater elements 251 to break the power input from lines 256 in the event of overheating of the fluid. It will be understood that unit 254 senses the temperature of the fluid in outlet line 253 and by linkage, diagrammatically indicated at 257, opens breaker switch 255, thus effectively limiting the maximum temperature of the fluid heated in chamber 250. Although shown in FIG. 2 and discussed above as a secondary heat transfer fluid heater, it will be evident that an electrical heater such as shown in FIG. 17 can be used to heat the heavy fuel directly, with the power input varied in response to the control signal output from the viscosity sensing unit, such control being effected by a variable rheostat in the power input line.

Equally evident is the fact that other suitable heat transfer fluid and/or heavy fuel heating means can be provided, such as the fuel-fired steam generator shown in block diagram in FIG. 3 and shown in diagrammatic cross section in FIG. 18, the secondary heat transfer fluid in such event then being the generated steam. Such steam generator can for example take the conventional form indicated, wherein the boiler chamber 260 is heated by combustion of a fuel-air mixture delivered axially thereof from fuel nozzle 261, a portion of the combustion air being delivered by blower 262 and aspirated into chamber 260, as indicated at 263. Steam heating coil 264 is situated in boiler chamber 260, and the combustion gases exhaust through said coil 264, as indicated at 265, thence out exhaust stack 266. Inlet line 267 to steam coil 264 connects with the high pressure output end of transfer pump 82 of FIG. 5, and steam outlet line 268 connects with line 84, a suitable water trap 269 being provided, as necessary. It will be apparent that in a given installation using steam as the secondary heat transfer fluid, the fuel for nozzle 261 can be diesel oil, obtained from diesel fuel tank 26 of the power plant, or the steam can be obtained from an equivalent steam generator of sufficient capacity already installed as auxiliary equipment as disclosed in publication "Engineman's Operating Manual" for Model F7 Locomotives, First Edition, February 1949, such as steam generator Model OK–4630 commonly so installed on Model F7 locomotives.

Consideration will now be given to a modified, load sensing dual fuel control unit, such as set forth in FIGS. 2 and 3 D', such modified unit and circuits connecting the same to representative loads being shown in vertical cross section and schematically in FIGS. 10 and 10A. Such applications of the present invention involve substitution of a load responsive component assembly for the speed responsive component assembly of the control system illustrated in FIG. 6, the load responsive unit more specifically comprising those elements operating to selectively position shaft 302, corresponding to shaft 169 and consequently control valves 307 and 308, respectively corresponding to valves 170 and 135 of FIG. 6, in relation to generated load as a factor of engine performance. It will be noted that a control unit sensing generated load is ideally adapted for use in conjunction with a constant speed, variable load engine, such as is commonly employed as the prime mover in stationary power generating equipment (cf. FIG. 3). A control unit sensing generated load can also be employed in conjunction with a variable speed, variable load prime mover (cf. FIG. 2), since when the engine speed is either constant or variable in normal operation, the generated load is a factor of engine performance reflecting the fuel viscosity requirement thereof.

In the modified dual fuel control unit illustrated in FIG. 10, said variable load responsive unit 300 comprises an electromagnet 301 wound to provide the necessary ampere turns to produce through solenoid action an appropriate downward movement of control valve shaft 302, such downward displacement being directly proportional to the current passed through said electromagnet 301. Downward movement of control valve shaft 302 is against the force exerted by calibrated load control spring 303, which is compressed by action of spring retainer washer 304, adjustably positioned on control valve shaft 302 through pre-setting of suitable threaded lock nuts 305 and 306, as shown. From the indicated design, a precise repositioning of piston valves 307 and 308 on control valve shaft 302 is established with each change of current through electromagnet 301. To prevent hunting or sudden movement of piston valve shaft 302 which would otherwise be occasioned by sudden changes of load in the power generator driven by the associated compression ignition engine, an air dashpot is provided comprising piston 309 and cylinder 310, said piston 309 being mounted on shaft 302, and produces a braking action by reason of air pressure generated in chamber 311 or chamber 312 of cylinder 310 which resists sudden changes in position of valve shaft 302, the compressed air in chambers 311 and 312 being bled off through respective small orifices 313 and 314 in a manner conventional in this type of dashpot mechanism.

To facilitate the removal of cover 315 of this component assembly, plug and jack electrical connectors through the cover casing 315 are provided, comprising jack block 316 and plug block 317, the latter being removable from cover casing 315 by cooperating threaded portions, as indicated at 318. Of operational importance in this type of control component is provision for a conventional spring loaded shorting interlock physically connected to plug 317, as diagrammatically indicated at 317'. Release of contact rod 317'' upon removal of plug 317 from jack block 316 closes a shorting switch, shown in schematic dotted line, across the connectors of plug block 317. Such interlock mechanism 317 functions to prevent generation of dangerously high induced voltages between the connectors of plug block 317 in the event the latter is disconnected with the generator in operation.

In the modified embodiment of the present invention as illustrated in FIG. 10, the current energizing electromagnet 301 represents a measure of the power generated by A.C. generator 322 and delivered to load 321. Thus, in a typical installation, the A.C. generator 322 feeds the load 321 having in series therewith the primary of a current transformer 323, the secondary of which is wound so that the induced current is directly proportional to the power output of generator 322 and of a required value to operate electromagnet 301 consistent with the mode of fuel control operation here presented.

FIG. 10A schematically presents a typical D.C. generator-load circuit, the connectors of plug 317 being connected at points x, x thereof. In this circuit, D.C. generator 330 is driven by the engine and feeds load 331, the load circuit of generator 330 also being provided with a series resistance 332, the voltage drop across which develops a current of sufficient magnitude in the turns of electromagnet 301 to produce therein the appropriate load responsive movement of piston valve shaft 302.

From the foregoing description of the modified control components illustrated in FIGS. 10 and 10A, it will be apparent that a dual fuel control system of which such load responsive unit constitutes a part automatically causes selective delivery of diesel or heavy fuel to either an engine operated at constant speed, engine such as employed for stationary power generation or an engine operated at variable speed, such as employed as the prime mover in a locomotive, and that the generated load responsive elements presented will essentially perform the engine performance detecting functions of the speed responsive units, such as presented in FIG. 6.

Comparing the load sensing control unit and associated circuits of FIGS. 10 and 10A with the functional block diagram systems presented in FIGS. 2 and 3, in order to illustrate the servo relation between the signal inputs and signal outputs, said load sensing unit shown in FIG. 10 is a typical form of the load sensing unit D'. Signal input F' in FIG. 2 is the current induced in the secondary of current transformer 323 (FIG. 10) and signal input F'' of FIG. 3 is the voltage drop across resistance 332 (FIG. 10A). The positioning of shaft 302 mounting valves 307 and 308 by solenoid action as a result of current through coil 301 requires a relatively small amount of energy as compared with the pressure of the hydraulic control fluid in accumulator 156 (FIG. 6) so that output signal G' controlling fuel changeover valve H and output signal U' controlling heat transfer throttle valve P each derives control energy from the hydraulic control fluid pressure rather than directly from load sensing unit D' or viscosity sensing unit E. Thus, said fuel changeover valve H and heat transfer throttle valve T are controlled by servo action in this form of the invention as well.

A further modified form of the present invention, presented in FIGS. 19 and 20, relates to a dual fuel control system corresponding in function to the control system presented in FIG. 6, wherein the engine speed and fuel viscosity sensing elements selectively actuate electrical control circuits to provide electrical energization of the fuel changeover valve and heavy fuel heat control valve. In this further exemplification of the invention, shaft 350 is rotated, as indicated at 350', by the cam shaft or main shaft of the prime mover or by belt drive therefrom, and has attached thereto a bar magnet 351 rotated at a speed directly proportional to the speed of the prime mover. Soft iron drag cup 352 has magnetically induced therein currents generated by the rotating field of the rotating bar magnet 351, and torque is produced by the interaction of the induced field currents and the magnetic field of said bar magnet 351. The action between rotating bar magnet 351 and drag cup 352 will be seen to be the same as exists between the rotor and field in a stalled induction motor. Drag cup 352 is keyed to shaft 353 which is in turn keyed to drag cup contact arm 354. Drag spring 355 is arranged to resist such angular movement of drag cup arm 354 and therefore the drag cup arm 354 is rotated through an angle directly proportional to the torque induced in drag cup 352 by the rotating bar magnet 351.

Electrical contacts 356 and 357 are mounted on drag cup contact arm 354 and are therefore also positioned angularly according to the speed of the prime mover. Electrical contact 358, mounted on stationary contact arm 359, adjustably positioned on shaft 371 by means of bolt 359', is positioned to be brought into contact with contact 357 at the fuel changeover point and thereby energizes relay 360 through a circuit comprising connectors 361 and 362 and power source 363, the energization of relay 360 causing closure of contact 364 thereof to in turn cause energization of spring pressed solenoid 365 which, in this embodiment of the invention, constitutes the actuating mechanism for dual fuel changeover valve 60 at the fuel changeover point, it being readily understood that such energization of solenoid 365 also includes in the circuit therefor a suitable power source 366. It will further be readily understood that a suitable jack block 367 is provided in casing 368 of the control assembly to pass connectors 361 and 362 therethrough.

A mechanical link 369 from the viscosity sensing component assembly, which is actuated by suitable mechanical linkage from balance bar 110 (see FIG. 6), angularly positions arm 370 according to the viscosity of the fuel being delivered to the engine. Arm 370 is keyed to shaft 371 which is in turn keyed to contact arm 372, which contact arm 372 has mounted at the extremity thereof contact 373. Thus, contact 373 is positioned angularly according to the viscosity of the fuel, and contact 356 makes contact with contact 373 as the engine speed increases. With establishment of contact between contacts 356 and 373, an energization circuit through connectors 374 and 375 passing through jack block 381, and power source 376 is closed to energize relay 377. Upon closure of contact 378 of relay 377 by energization of the latter, spring pressed solenoid 379 is energized by power source 380. Spring pressed solenoid 379 controls heavy fuel heat control valve 91, the arrangement being such that with energization of solenoid 379 butterfly valve 220 of heat control valve 91 (see FIG. 15) is rotated in a closing direction, thereby reducing the heat transfer fluid flow rate and raising the viscosity value of the heavy fuel. As the heavy fuel is accordingly cooled and its viscosity appropriately raised, for example, the viscosity responsive component assembly senses such change and moves contact 373 away from contact 356, de-energizing relay 377 and solenoid 379, whereupon butterfly valve 220 is rotated in an opening direction. As will be seen, the manner of actuation of the butterfly control valve 220 may be described as of the on-off type, and will "hunt" about the control point.

In a typical arrangement of the modified dual fuel control system presented in FIGS. 19 and 20, drag cup contact arm 354 is arranged to rotate approximately 90° under influence of drag cup 351 in the range of engine speed where the heavy fuel viscosity is to be controlled. Similarly, in such typical design, contact arm 372 is rotated through action of arm 370 through an arc of approximately 60° by the viscosity responsive component assembly in its full range of operation.

A further refinement of the modified form of dual fuel control system presented in FIGS. 19 and 20 resides in a fluid type thermostat switch 382 in communication through line 383 with a fluid thermostat in the exhaust manifold of the prime mover, which functions to provide a safeguard against possible emergency conditions of operation where, as in applications of diesel engines in the trucking industry, a "runaway" situation might develop where low power output renders desirable operation on diesel fuel, although an engine speed exists where the dual fuel changeover valve is in heavy fuel delivery position. Thermostat switch 382 and the associated actuating mechanism is selected to be opened only under abnormally low exhaust temperature conditions and functions to independently de-energize solenoid 365 to cause redelivery of diesel fuel by the dual fuel changeover valve 60 under such emergency situations when a severe drop in combustion zone temperature occurs. In this connection, it is to be noted that such safeguard is not necessary in the speed responsive embodiment of the invention first presented, since locomotive and marine power installations do not customarily involve a motive drive where the vehicle propelling unit imparts driving energy to the engine.

It will be evident that the electrical speed responsive unit presented in FIGS. 19 and 20 exhibits the servo control characteristic of the present invention, since the only control signal input energy necessary is that required to rotate contact arm 354 and contact arm 372, the source of control energy for repositioning changeover valve 60 being power source 366 energizing solenoid 365, and the source of control energy for controlling throttle valve 91 being power source 380 energizing solenoid 379.

Yet another modification of the dual fuel control system of the present invention is presented in FIGS. 21 and 22, involving pneumatic actuation of the automatic fuel selection and heavy fuel heat control valve, and involving electrical energization of the load sensing and viscosity sensing control components. The pneumatic control assembly illustrated in FIGS. 21 and 22 utilizes the voltage output from a conventional speed responsive electric tachometer of the permanent magnet D.C. generator type or a voltage generated across a shunt proportional to engine load, as the case may be, to sense the performance of the engine. Control vane 400 is affixed to needle 401 which is mounted in a conventional D'Arsonval electric meter movement in turn energized by said tachometer output, the angular position of needle 401 and attached control vane 400 thereby being determined by the power output of the engine. As control vane 400 rotates with needle 401, it passes closely in front of control orifice 402 which is in turn mounted on bracket 403 adjustably positioned with respect to control vane 400 by preselected location of slot 404 of bracket 403 with respect to clamping screws 405 and 406. This adjustment permits establishment of the appropriate angular position of control orifice 402 with respect to control vane 400 to cause fuel changeover at the appropriate engine condition. Control orifice 402 is connected by flexible hose 407 to head area 408 of pneumatic cylinder 409, and air under pressure is delivered from a suitable air supply, not shown, through line 410 and through a constricted passage 411 to said control orifice 403 and said flexible hose 407. By this arrangement, if control vane 400 covers control orifice 402, then a pressure nearly equal to the line pressure in line 410 is generated in chamber 408 of pneumatic cylinder 409 and piston 412 is pushed back against compression spring 413 to extend piston rod 414 which in turn actuates dual fuel changeover valve 60 to heavy fuel delivering position. Correspondingly, as the condition of engine operation changes to a lower power level, control vane 400 uncovers control orifice 402 and, since control orifice 402 is larger than constricted passage 411, the air is released through said control orifice 402 from chamber 408 of pneumatic cylinder 409 and piston 412 moves downwardly under the force exerted by spring 413, causing rod 414 to return the fuel changeover valve 60 to diesel fuel delivering position. Needle valve 415 is a damping adjustment provided in pneumatic cylinder 409 and controls the response speed of piston 412 in a conventional manner.

Proceeding to a consideration of the pneumatic system for automatically controlling the fuel viscosity, as presented in FIG. 22, needle 420 is mounted on the same shaft as needle 401 (FIG. 21), and control vane 421 is attached thereto, said needle 420 being moved by the same D'Arsonval type electric meter movement as needle 401 and thus responsive to engine speed or generated load, as the case may be. Control orifice 422 is mounted on arm 423 which in turn is pivoted about shaft 424 under control of a suitable linkage 425 actuated by balance bar 110 of the viscosity responsive component assembly (see FIG. 6). Thus, the angular position of arm 423 and control orifice 422 is determined by the viscosity of the fuel. For low engine speeds or loads, control vane 421 is clear of control orifice 422 and air passing constriction 426 in inlet air pressure line 427 is not sufficient to build up pressure in chamber 429 of pneumatic cylinder 430, air pressure inlet pipe 427 and its constriction 426 being in communication with both the control orifice 422 and with said chamber 429, the latter communication being through flexible hose 428. Under such low power conditions, piston 431 is delivered to a lower position by compression spring 432 and butterfly control valve 220 (see FIG. 15) is in its open position by connection of the actuating mechanism for said butterfly valve 220 with piston shaft 433. As the engine output increases above the fuel changeover point, control vane 421 and control orifice 422 move nearer together, and control orifice 422 becomes covered sufficiently to build up enough air pressure in chamber 429 of cylinder 430 to move piston 431 and reposition butterfly valve 220 (see FIG. 15) to a relatively closed position so that the heavy fuel will be heated in heavy fuel heater 32 to an appropriate higher viscosity for the new power output condition. Since the viscosity equilibrium point of this pneumatic control arrangement, as presented in FIG. 22, involves only partial closure of control orifice 422 by control vane 421, it will be apparent that the control exercised is modulating rather than on-off in nature. Further changes in engine output or generated load correspondingly reposition control orifice 422 through action of linkage mechanism to the viscosity sensing unit comprising link 425 resulting in automatic repositioning of butterfly valve 220.

FIGS. 23 and 24 present yet another form of hydraulic dual fuel control servo-unit incorporating a speed responsive component assembly and a viscosity sensing component assembly which can be advantageously substituted for the dual fuel control unit presented in FIG. 5. FIG. 23 is a vertical cross section view of such modified unit with connecting hydraulic control fluid lines and fuel feed and return lines indicated by arrows designated with like numerals to show the connection thereof in the dual fuel system of FIG. 5, and with interior elements corresponding in function to the elements of the control unit of FIG. 6 being designated by corresponding prime numerals. FIG. 24 presents a schematic diagram of the various fuel line and hydraulic control fluid line connections of the dual fuel unit presented in FIG. 23, also showing the points of connection thereof to the fuel feed and return lines of the dual fuel control system of FIG. 5.

Considering first the speed responsive component assembly of FIG. 23, drive shaft 450 is an extension of the tachometer drive shaft and as such is rotatively driven by the engine, as indicated at 451. Shaft 450, the outer end of which is journaled in housing 452, is also adapted at its free end, as indicated at 454, to have the conventional tachometer drive cable of the engine connected thereto. Drive shaft 450 has keyed thereto spur gear 455 which meshes with and drives spur gear 456 in turn driving shaft 157' and the gear pump comprising gears 152', and 151', said gear 152' being mounted thereon. The flexible coupling 457 is provided along shaft 157', as desired. Bearings 458 and 459 mounted on casing 30' of the unit retain the upper portion of shaft 157' which, at its upper extremity mounts and rotates gear 158'. Gear 158' drives gear 159' which in turn rotates sleeve 460 in bearing 461. Sleeve 460 and concentric shaft 462 cooperatively mount the speed governor elements including weights 160' and 161', pivoted arms 463 and 464, header 465 and speeder spring 166', the action of the speed governor elements being such that when weights 160' and 161' move outwardly with increase in centrifugal force, header 465 moves shaft 462 downwardly against the compressive force of speeder spring 166'. The compressive force of speeder spring 166' is advantageously adjustable by means of placing one or more washers around the upper portion of sleeve 460, one such washer being indicated at 466. Shaft 462 at its lower end is connected through bearing 470 to shaft 471, said bearing 470 isolating shaft 471 from rotation. Shaft 471 is in turn adjustably connected through ball and socket linkage 472 to valve shaft 169'.

The gear pump comprising gears 151' and 152' serves to deliver hydraulic control oil from pump 153' through lines 154' and 155' to hydraulic control oil accumulator 156', provided with over-pressure return line 199', the over-pressure return circuit being past piston 193' through by-pass channel 475 then around accumulator spring 194', through orifices 476, then through return line 199'. The output from accumulator 156' is shown at 180', which line also has an input to pilot valve cylinder 477 mounting an upper fixed sleeve 478. Valve 170', including lands 171' and 172', serves to selectively deliver the hydraulic control fluid from input 180' to either line 182 or line 187 leading to the fuel changeover valve and fuel return valve actuating mechanisms 183 and 97 (cf. FIG. 6).

The return path for the hydraulic control fluid from the outer control area 188' in shaft 169' is through the space between said sleeve 478 and movable sleeve 130', hereinafter discussed in connection with the viscosity sensing component assembly, such space being indicated at 189'. Space 189' connects with the recessed portion 479 of pilot valve cylinder 477 and exhausts through orifice 480 to return line 190'.

The viscosity sensing component assembly employed in the modified dual fuel control unit presented in FIGS. 23 and 24 is of the type disclosed more specifically and claimed in the copending application of Robert F. Viggers and Joel B. Rockstead entitled "Viscosimeter Having Variable Sensitivity and Hydraulic Servo Output," filed herewith.

The viscosity sensing component assembly presented in FIG. 23 operates in conjunction with a constant pressure differential regulator 500 maintaining a constant pressure differential between fuel inlet line 100 and fuel outlet line 100'. The elements of such constant pressure differential regulator 500 are conventional per se and include a spring pressed piston 501 having a wedge shaped head portion 502 abutting stop pin 511 when the piston 501 is at rest. Said piston 501 is maintained under an adjustable pressure by means of spring 503, the inner bore 504 and spring seat plug 505 being threaded to provide such adjustability. Spring seat plug 505 is also provided with a locking cover 506 threaded thereon. By such elemental arrangement, the inlet line pressure is established in head area 507 of the regulator and the outlet line pressure is maintained in cylinder bore area 508 by means of a slot 509 cut in one side of piston 501 just below the slope portion 502 thereof and communicating with said cylinder bore area 508. With a given tension on spring 503, should a relative over-pressure occur in area 508, spring 503 will be compressed slightly to place area 507 in communication with channel 510, relieving such inlet over-pressure or deficient outlet pressure, as the case may be. As a practical matter, in a typical installation, only about one-sixth of the fuel passing from inlet line 100 to outlet line 100' courses through the viscosity sensing unit, the balance being by-passed by regulator 500 directly from line 100 to line 100'.

The viscosity sensing components include a laminar flow section comprising spring pressed piston 520 dimensioned to provide between said piston 520 and the flow section housing 521 an annular laminar flow passageway 522. Piston 520 is urged upwardly against the drag of the fuel through said laminar flow passageway 522 by spring 523, resting against spring seat 524 in turn mounted on sleeve 525 of partition plate 526. Arranged below partition plate 526 is an annular constricted orifice of variable dimension formed by fixed orifice plate 527 and a tapered pin 528 mounted on shaft 529 in turn connected to piston 520 through spring guide 530.

From the high pressure outlet 535 of constant pressure differential regulator 500 a portion of the fuel passes through line 536 to inlet 537 of the viscosity sensing unit. From inlet 537 the fuel passes from head area 538 of piston 520 through the annular laminar flow passageway 522, thence through orifices 539 in partition plate 526 and through the annular constricted orifice formed by orifice plate 527 and tapered pin 528.

As more fully set forth in said copending application, it is the function of the variable constricted orifice formed by orifice plate 527 and tapered pin 528 to render the positioning of piston 520 more sensitive to incremental viscosity changes of the fuel. In a typical embodiment of this form of viscosity sensing unit, with a fuel inlet pressure of 60 p.s.i. and a pressure differential between lines 100 and 100' of 20 p.s.i., with piston 520 having a cross sectional area of 1 square inch, with the lateral dimension of laminar flow passageway 522 being .015 inch, with the total cross sectional area of said passageway 522 being about .06 square inch, and with the cross sectional area of the variable constricted orifice formed by said orifice plate 527 and said tapered pin 528 varying from about .003 to .005 square inch depending upon the position of tapered pin 528 therein, the viscosity sensitive elements were sensitive to fuel viscosities in the range from 6 to 8 centipoises. Thus, an incremental change of fuel viscosity of only 2 centipoises was necessary to shift piston 520 from one extent of its travel to the other, thus markedly increasing the incremental sensitivity of the viscosity sensing unit in terms of the viscosity error necessary to generate a given degree of movement of piston 520.

Such increase in sensitivity is affected generally as follows. Since the pressure drop between inlet orifice 537 and outlet orifice 540 in housing end 541 is constant, the total pressure drop through laminar flow passageway 522 and through the variable orifice remains constant. When the fuel viscosity becomes relatively higher, piston 522 is moved to a relatively low position in housing 521 and the cross sectional area of the variable orifice is relatively increased, which in turn places a greater proportion of the pressure drop across said laminar flow passageway 522 and thereby increases the tendency of the piston 520 to move downwardly at such higher viscosity. Conversely, with a decrease in fuel viscosity, piston 522 moves upwardly and the cross sectional area of the variable orifice is relatively decreased, which in turn places a lesser proportion of the pressure drop across laminar flow passageway 522 and thereby increases the tendency of piston 520 to move upwardly.

From the foregoing considerations it will be evident that the viscosity sensing unit presented in FIG. 23 demonstrates a marked increase in sensitivity to incremental changes in viscosity, in terms of the increment of movement of laminar flow piston 522. The incremental viscosity sensitive mechanical output available from relative movement of piston 522 is connected through a hydraulic servo system to output rod 550 through the following hydraulic servo mechanism. Piston 551 is connected to said output rod 550 and reciprocably arranged with respect to cylinder 552 in turn provided in the head portion of laminar flow piston 520, inner head chamber 553 being in communication with inlet orifice 537 and outer head chamber 538 through orifices 554 so that the inlet fluid pressure in inner head chamber 553 tends to force piston 551 against compression spring 555 and force output rod 550 upwardly.

In a given servo control condition, assuming the viscosity sensing component assembly is in operation and piston 520 moves slightly upwardly, orifices 556 provided in piston 551, which are partially in communication with inlet 537, tend to be closed off by tapered extension 557 integral with the head of piston 520. When relatively closed, orifices 556 cause the pressure in inner head area 553 to impart an upward movement to piston 551 and output rod 550. Such upward movement continues until orifices 556 again partially clear extension 557 of piston 520 to the point where an equilibrium condition exists with the pressure of spring 555 balancing the inlet liquid pressure in inner head area 553, at which point the upward movement of piston 551 and output rod 550 ceases until further change in position of laminar flow piston 520. Conversely, with the downward movement of piston 520, spring 555 will push piston 551 downwardly until the equilibrium condition between orifices 556 and extension 557 is again established. Thus, the control energy appearing at output rod 550 is derived from the hydraulic pressure of the fuel at inlet 537, the movement of laminar flow piston 520 merely effecting a control of such hydraulic pressure rather than actually contributing the energy necessary to move said output rod 550.

In the absence of a hydraulic servo output mechanism, the available output energy from piston 520 within desired accuracy tolerances would be of the order of magnitude of an ounce or less, whereas with said hydraulic servo mechanism the energy output can readily be of an order of magnitude of about 10 pounds or more, assuming a pressure drop of approximately 10 pounds per square inch between inlet orifice 537 and orifice plate 560 in outlet 561 leading to outlet line 562 from the servo portion of the viscosity sensing unit. Fuel flow in the servo portion of the unit is from orifices 556 into bore 563, thence through orifices 564 and through orifices 565 communicating through channel 566 with constricted output orifice 560.

A further feature of the servo portion of the viscosity sensing component assembly presented in FIG. 23 is that extension 557 of piston 520 is upwardly and inwardly tapered in the manner indicated. The purpose of this taper is to provide as small an upper surface adjacent to orifices 556 as possible consistent with durability, in order to minimize any Venturi or aspirating effect and consequent reduced downward pressure as respects that portion of piston 520 immediately adjacent to the orifices 556 as would otherwise result from the high velocity of the fuel across such portion of extension 557, which reduced downward pressure is generally proportional to the area of such adjacent piston portion. If the cross sectional area of the upper lip of extension 557 were substantial, as compared with the total cross sectional area of piston 520, the effect of such intermittent aspiration as is occasioned by incremental movement of piston 520 and incremental followup of piston 551 would possibly be of consequence to the accuracy of the mechanical output signal on output rod 550.

A pressure seal 570 is provided around output rod 550 which at its upper portion is connected through a universal joint such as adjustable, double ball and socket assembly 571 with sleeve 130' of the pilot valve.

Pilot valve sleeve 130', including orifices 132', 133' and 134', cooperatively functions with that portion of pilot valve shaft 169' comprising valve 135' and lands 195' and 196' to control the flow of hydraulic control fluid from input 201' to output lines 202 and 212 in the same manner as is accomplished by the corresponding pilot valve elements of the control unit presented in FIG. 6.

Return line 542 communicates the outlet 540 of the viscosity sensing unit with the low pressure inlet 543 of constant pressure differential regulator 500. Output line 552 from the servo portion of the viscosity sensing component assembly also returns to said low pressure inlet 543, as indicated in FIG. 24.

FIG. 25 illustrates a modified form of heavy fuel heater, of the type shown diagrammatically in FIG. 4, for heating the heavy fuel directly by means of recirculating the same through a heavy duty pump driven by the engine, the output of such heavy duty pump being controlled by a throttle valve positioned responsive to the control assembly viscosity sensing unit.

In FIG. 25, the heavy fuel tank is delivered through line 600 in the direction indicated at 601, and first courses through a preheater 602 and is heated therein to a temperature of about 140° F. by heat exchange with engine cooling water. The engine cooling water is circulated through such preheater 602 by suitable means such as coil 603 arranged therein. Fuel output line 604 from the heavy fuel preheater 602 delivers the heavy fuel to the input 605 of a heavy duty pump 606 comprising gears 607 and 608, one of which is mechanically driven by shaft 609 from the engine, such rotational drive being indicated at 610. The output line from said heavy duty pump 606 includes a recirculation circuit consisting of line 611, pressure relief valve 612, throttle valve 613 and return line 614 in communication with inlet line 605 of said heavy duty pump, the recirculation path being as indicated by arrows at 615 and 616. Output line 617 from the inlet side 605 of said heavy duty pump 606 delivers the heated heavy fuel to the fuel changeover valve, the direction of outlet flow being indicated at 618. In a typical installation, said pump may be a standard heavy duty pump which when driven at 800 r.p.m. generates a fuel flow of 90 gallons per minute at an outlet pressure (line 611) of 410 pounds per square inch. Such pump when so driven generates 17 brake horsepower with the indicated pressure drop, and generates 43,000 B.t.u.'s per hour. With a line flow of 90 gallons per hour, the heavy fuel temperature can be raised as much as an additional 150°, i.e. to a maximum temperature of about 290° F. In the typical heavy duty pump type heavy fuel heater presented, a control orifice having an average diameter of about 1 inch was employed, it being understood that the control orifice diameter is varied in throttle valve 613 by movement of tapered pin 619 under control of the viscosity sensing unit, which movement is schematically indicated at 620. Under the operating conditions set forth, pressure relief valve 612 is preset at 500 p.s.i. for protection of the pump 606 and line 611 against pressure overload.

From the foregoing it will be apparent that the heavy fuel in any given installation can be heated to the necessary temperature and appropriate viscosity, with suitable variation in the heavy duty pump capacity and heavy fuel line pressures generated, as dictated by the maximum heavy fuel temperature to be achieved.

This application is a continuation-in-part of my copending application Ser. No. 503,712, entitled Dual Fuel Control Systems for Diesel and Gas Turbine Engines and the Like, filed April 25, 1955, now abandoned.

From the foregoing various arrangements and embodiments of the present invention, and principles and modes of operation set forth with respect thereto, it will be seen that various other modifications thereof may be undertaken within the skill of the art within the scope of the present invention, as set forth in the following claims.

What is claimed is:

1. A dual fuel control system for an engine burning diesel-type fuel and incorporating a fuel injection system therefor, comprising means for selectively delivering diesel fuel or heavy fuel to said fuel injection system, and further comprising automatic fuel changeover means including engine performance factor sensing means, fuel viscosity sensing means, means for heating said heavy fuel, and means regulating the heat input rate to said heavy fuel under control of said viscosity sensing means to heat said heavy fuel and lower the viscosity thereof to a value satisfying the fuel viscosity requirement of the engine.

2. An automatic dual fuel control system for an engine burning diesel-type fuel and incorporating a fuel injection system therefor, comprising a first control unit sensing a factor of engine performance reflecting power output and selectively controlling delivery of either diesel or heavy fuel to said fuel injection system in response to such engine performance factor, a second control unit sensing the viscosity of fuel delivered to the fuel injection system of the engine, and heavy fuel heating means controlled by both said control units and serving to dynamically maintain the viscosity of the heavy fuel at a value satisfying the fuel viscosity requirement of the engine corresponding to said engine performance factor.

3. A dual fuel control system according to claim 2, wherein said first control unit senses engine speed.

4. A duel fuel control system according to claim 2, wherein said first control unit senses the load driven by said engine.

5. A dual fuel control system for an engine burning diesel type fuel and incorporating a fuel injection system therefor, comprising means for sensing an engine performance factor reflecting power output, means for sensing the viscosity of the fuel delivered to the fuel injection system of said engine, a servo means under control of said performance factor sensing means in turn controlling actuation of a fuel changeover valve serving to deliver either diesel or heavy fuel to said engine, heavy fuel heating means and servo means under control of such viscosity sensing means in turn controlling said heavy fuel heating means to maintain the viscosity of the heavy fuel at a satisfactory level for combustion thereof when the same is delivered to said engine.

6. A system according to claim 5, wherein said fuel viscosity sensing means comprises a constant pressure differential regulator communicating the fuel delivery line with a laminar flow section and a constricted orifice connected across such constant pressure differential regulator, mechanical movement generated by said laminar flow section being linked to said viscosity sensing means responsive servo means.

7. A dual control system for an engine burning diesel-type fuel and incorporating a fuel injection system therefor, comprising diesel fuel storage means, and heavy fuel storage means for selectively delivering diesel fuel or heavy fuel to said fuel injection system, said system further comprising an automatic fuel changeover control circuit including a power output sensing means for switching said selective delivery means to delivery of heavy fuel above a predetermined intermediate engine output level, fuel viscosity sensing means, heavy fuel heating means, and means regulating the heat input rate to said heavy fuel in response to said power output sensing means and said viscosity sensing means maintaining the viscosity of the heavy fuel sufficiently low to enable efficient combustion thereof in the engine at power output levels of the latter above said predetermined intermediate power output level.

8. A system according to claim 7, wherein said power output sensing means is responsive to engine speed.

9. A system according to claim 7, wherein said power output sensing means is responsive to the generated load.

10. A system according to claim 7, wherein said heavy fuel heating means comprises a recirculation system containing a secondary heat transfer fluid.

11. A system according to claim 10, wherein said secondary heat transfer fluid is heated in a steam generator.

12. A dual fuel control system for an engine burning diesel-type fuel and incorporating a fuel injection system therefor, comprising a dual fuel changeover valve, means for delivering diesel fuel to said changeover valve, means responsive to the viscosity of the fuel delivered to said fuel injection system for heating heavy fuel to a predetermined low viscosity satisfactory for efficient combustion thereof at an intermediate power output level of operation of said engine, means for delivering heated heavy fuel to said changeover valve, means sensing the power output level of the engine and controlling said changeover valve to deliver fuel to said fuel injection system at power levels thereof below said intermediate power output level and controlling said changeover valve to deliver heated heavy fuel to the fuel injection system of the engine at and above said intermediate power output level and means controlling the rate of heat absorption of said heavy fuel responsive to the power output level of said engine to automatically maintain the viscosity of the heavy fuel delivered to the engine at its lowest value at changeover from diesel to heavy fuel and proportional to the power output level of said engine above said changeover.

13. A dual fuel control system for an engine burning diesel type fuel and incorporating a fuel injection system therefor, comprising a dual fuel changeover valve, means for delivering diesel fuel to said changeover valve, means for delivering heavy fuel to said changeover valve, means responsive to the viscosity of the fuel delivered to the engine fuel injection system for heating said heavy fuel to a predetermined low viscosity satisfactory for efficient combustion thereof at a predetermined intermediate engine speed, means responsive to engine speed establishing said changeover valve in a position to deliver diesel fuel to the fuel injection system of the engine at speeds thereof above said predetermined speed, and means controlling the rate of heat absorption of said heavy fuel responsive to the engine speed to automatically maintain the viscosity of the heavy fuel delivered to the engine at its lowest value at changeover from diesel to heavy fuel and proportional to the power output level of said engine above said changeover.

14. The method of operating an engine burning diesel-type fuel and incorporating a fuel injection system therefor, comprising sensing the viscosity of the fuel delivered to the fuel injection system of said engine, heating heavy fuel to impart low viscosity characteristics thereto enabling satisfactory combustion thereof at an intermediate power output level of said engine, delivering said heavy fuel to the fuel injection system of said engine when a factor of engine performance reflecting power output is at and above a predetermined intermediate value, and maintaining the viscosity of the heavy fuel when so delivered at the optimum required by varying conditions of operation of said engine in response to such engine performance factor.

15. The method according to claim 14, further comprising automatically compensating the viscosity of the heavy fuel so heated in direct proportion and responsive to changes in engine speed when said factor of engine performance is above said predetermined value.

16. The method according to claim 14, further comprising utilizing said engine as the prime mover in a stationary power generation system and automatically compensating the viscosity of the heavy fuel during higher levels of generated load in direct proportion to the magnitude of such load.

17. The method of operating an engine burning diesel-type fuel and incorporating a fuel injection system therefor, comprising starting and operating said engine at low power levels while delivering diesel fuel to the fuel injection system thereof while preheating heavy fuel to a degree sufficient to impart satisfactory combustion characteristics thereto at an intermediate power output level of operation of said engine, automatically delivering said heated heavy fuel to the engine at said intermediate and higher power output levels thereof under control of engine performance factor sensing means, and regulating the viscosity of the heavy fuel when so delivered under control of such performance factor to maintain the viscosity thereof proportional to the power output level of said engine.

18. In combination with an engine burning diesel-type fuel and incorporating a fuel injection system therefor, means delivering heated heavy fuel to said fuel injection system during operation involving relatively high engine power output levels, means monitoring the viscosity of said heated heavy fuel, and servo means responsive to such viscosity monitoring means serving to control the degree of heating of said heavy fuel.

19. The combination of claim 18, wherein said servo means is of the hydraulic type.

(References on following page)

References Cited in the file of this patent

UNITED STATES PATENTS

| | | |
|---|---|---|
| 1,105,016 | Bassford | July 28, 1914 |
| 1,334,491 | Henner | Mar. 23, 1920 |
| 1,776,871 | Thurber | Sept. 30, 1930 |
| 1,819,474 | Meyer | Aug. 18, 1931 |
| 1,881,200 | Leask et al. | Oct. 4, 1932 |
| 2,059,334 | Gustafsson | Nov. 3, 1936 |
| 2,129,930 | Hans | Sept. 13, 1938 |
| 2,163,241 | Huber | June 20, 1939 |
| 2,231,764 | Laing | Feb. 11, 1941 |
| 2,681,694 | Loft | June 22, 1954 |
| 2,768,496 | Stamm et al. | Oct. 30, 1956 |

FOREIGN PATENTS

| | | |
|---|---|---|
| 10,340 | Great Britain | May 18, 1911 |
| 627,261 | Germany | Mar. 11, 1936 |